(12) United States Patent
Chakraborty et al.

(10) Patent No.: US 11,797,742 B1
(45) Date of Patent: Oct. 24, 2023

(54) POWER AWARE REAL NUMBER MODELING IN DYNAMIC VERIFICATION OF MIXED-SIGNAL INTEGRATED CIRCUIT DESIGN

(71) Applicant: Synopsys, Inc., Sunnyvale, CA (US)

(72) Inventors: Diganchal Chakraborty, Karnataka (IN); Jiri Prevratil, Dallas, TX (US); Harsh Chilwal, San Jose, CA (US); Shreedhar Ramachandra, Sunnyvale, CA (US); Prasenjit Biswas, Karnataka (IN)

(73) Assignee: SYNOPSYS, INC., Sunnyvale, CA (US)

( * ) Notice: Subject to any disclaimer, the term of this patent is extended or adjusted under 35 U.S.C. 154(b) by 29 days.

(21) Appl. No.: 17/559,901

(22) Filed: Dec. 22, 2021

Related U.S. Application Data

(60) Provisional application No. 63/129,112, filed on Dec. 22, 2020.

(51) Int. Cl.
| | | |
|---|---|---|
| *G06F 30/38* | (2020.01) | |
| *G06F 30/398* | (2020.01) | |
| *G06F 30/323* | (2020.01) | |
| *G06F 30/3308* | (2020.01) | |
| *G06F 119/06* | (2020.01) | |

(52) U.S. Cl.
CPC ............ *G06F 30/38* (2020.01); *G06F 30/323* (2020.01); *G06F 30/3308* (2020.01); *G06F 30/398* (2020.01); *G06F 2119/06* (2020.01)

(58) Field of Classification Search
CPC ...... G06F 30/38; G06F 30/398; G06F 30/323; G06F 30/3308; G06F 2119/06
USPC ................... 716/106, 111, 136, 103; 703/14
See application file for complete search history.

(56) References Cited

U.S. PATENT DOCUMENTS

| | | | | |
|---|---|---|---|---|
| 8,365,132 B2* | 1/2013 | Hsu | ......................... | G06F 30/33 |
| | | | | 716/109 |
| 8,943,452 B2* | 1/2015 | Hsu | ......................... | G06F 30/33 |
| | | | | 716/109 |
| 9,189,578 B1* | 11/2015 | Giangarra | ............... | G06F 30/30 |
| 10,417,372 B2* | 9/2019 | Hsu | ........................ | G06F 30/398 |
| 10,769,336 B1* | 9/2020 | Zhang | ..................... | G06F 30/38 |
| 2014/0013293 A1* | 1/2014 | Hsu | ......................... | G06F 30/33 |
| | | | | 716/133 |

(Continued)

*Primary Examiner* — Phallaka Kik
(74) *Attorney, Agent, or Firm* — Lewis Roca Rothgerber Christie LLP

(57) ABSTRACT

A method includes: receiving a representation of a mixed-signal integrated circuit design including an analog circuit portion and a digital circuit portion including a plurality of descriptions of a power supply, the descriptions including a power supply network description and a register transfer level (RTL) hardware description language (HDL) description; determining a mismatch between the power supply network description and the HDL description of the power supply; generating a value converter to convert a voltage value associated with the power supply between the power supply network description and the HDL description; and converting, by a processor, between the power supply network description and the HDL description during runtime using the value converter to synchronize the power supply network description and the HDL description of the power supply responsive to the mismatch.

20 Claims, 12 Drawing Sheets

(56) References Cited

U.S. PATENT DOCUMENTS

2021/0209277 A1\* 7/2021 Joseph ................. G06F 30/327

\* cited by examiner

POWER AWARE REAL NUMBER MODELING IN DYNAMIC VERIFICATION OF MIXED-SIGNAL INTEGRATED CIRCUIT DESIGN

RELATED APPLICATION

This application claims the benefit of U.S. Provisional Patent Application No. 63/129,112, "UPF-BASED SIMULATION FOR REAL NUMBER-MODELING OF MIXED-SIGNAL DESIGNS," filed in the United States Patent and Trademark Office on Dec. 22, 2020, the entire disclosure of which is incorporated by reference herein.

TECHNICAL FIELD

The present disclosure relates to an electronic design automation system. In particular, the present disclosure is related to power aware real number modeling in dynamic verification of mixed-signal integrated circuit designs.

BACKGROUND

In various mixed-signal semiconductor circuit designs, the behavior of analog circuit portions can be modeled using real number modeling (RNM) capabilities of a hardware description language (HDL) such as SystemVerilog. In these designs, the RNM-modeled analog circuit portions are connected to digital circuit portions (e.g., modeled at the Register Transfer Level (RTL)) to model the functionality of the full, mixed-signal chip or integrated circuit having both analog and digital circuit portions.

The power distribution and power control information for a design-under-test (DUT) may be specified in detail using the Unified Power Format (UPF). The specification of power distribution for the full chip is referred to as a UPF supply network. The UPF format does not require a detailed power intent about how power supply rails are distributed and connected among different circuit portions or sub-circuits. Instead, the UPF format only specifies the power intent for the boundary pins of the analog circuit portions so that analog circuit portions (modeled using real number modeling (RNM)) can be integrated with the full chip environment for power aware simulation. The power intent of the supply pins of these circuit portions are often specified using, for example, a Liberty file, but may be specified using any integrated circuit (IC) implementation library format. A design of a circuit portion of the RTL specification for functionality and Liberty specification for power intent is usually referred to as a database (DB) cell.

SUMMARY

According to one embodiment of the present disclosure, a method includes: receiving a representation of a mixed-signal integrated circuit design including an analog circuit portion and a digital circuit portion including a plurality of descriptions of a power supply, the descriptions including a power supply network description and a register transfer level (RTL) hardware description language (HDL) description; determining a mismatch between the power supply network description and the HDL description of the power supply; generating a value converter to convert a voltage value associated with the power supply between the power supply network description and the HDL description; and converting, by a processor, between the power supply network description and the HDL description during runtime using the value converter to synchronize the power supply network description and the HDL description of the power supply responsive to the mismatch.

The generating the value converter may further include: assigning a direction to the supply pin of the analog circuit portion, the direction being selected from a group including: a power supply network to HDL direction (UPF2HDL); and an HDL to power supply network direction (HDL2UPF); responsive to assigning the direction of the supply pin as UPF2HDL, when an HDL driver is present, generating the value converter to propagate a voltage value from the HDL description of the power supply to the supply pin, otherwise generating the value converter to propagate a voltage value from the power supply network to the supply pin; and responsive to assigning the direction of the supply pin as HDL2UPF, generating the value converter to propagate a voltage value output by the analog circuit portion to the HDL description of the power supply and to the power supply network description of the power supply.

The generating the executable code may further include: detecting two different variables representing a voltage of a supply pin of the analog circuit portion of the mixed-signal integrated circuit design, the two different variables being defined based on the power supply network description and the HDL description; generating an assertion function that the two different variables have a same value; and inserting the assertion function into the representation of the mixed-signal integrated circuit design.

The method may further include: generating a notification in response to determining that the assertion function has failed, the notification indicating a difference in the voltage of the supply pin of the analog circuit portion as described by the power supply network description and the HDL description.

The value converter may be associated with a boundary port of the analog circuit portion of the mixed-signal integrated circuit design, and the generating the value converter may include: parsing an HDL representation of the value converter; determining a power intent associated with the boundary port based on the power supply network description; assigning a plurality of power supply definitions including a power voltage and a ground voltage to the value converter based on the determined power intent; and configuring the value converter based on the power supply definitions.

The power intent of the boundary port may be specified based on one or more of a supply network and a port attribute of the boundary port specified in the power supply network description. The power intent may be based on the analog circuit portion associated with the boundary port is associated with a specified power intent associated with the analog circuit portion. The power intent may be based on the analog circuit portion associated with the boundary port is associated with a power domain.

The value converter may be configured to convert a digital logic value to a real number value by: outputting the power voltage from the power supply definitions based on the determined power intent when the digital logic value is logical high; and outputting the ground voltage from the power supply definitions based on the determined power intent when the digital logic value is logical low.

The value converter may be configured to convert a real number value to a digital logic value by: outputting a logical low value as the digital logic value when the real number value is within a threshold voltage distance of the ground voltage from the power supply definitions based on the determined power intent; and outputting a logical high value as the digital logic value when the real number value is within the threshold voltage distance of the power voltage from the power supply definitions based on the determined power intent.

According to one embodiment of the present disclosure, a system includes: a memory storing instructions; and a processor, coupled with the memory and to execute the instructions, the instructions when executed cause the processor to: receive a representation of a mixed-signal integrated circuit design including an analog circuit portion and a digital circuit portion including a plurality of descriptions of a power supply, the descriptions including a power supply network description and a register transfer level (RTL) hardware description language (HDL) description; determine a mismatch between the power supply network description and the HDL description of the power supply; generate a value converter to convert a voltage value associated with the power supply between the power supply network description and the HDL description; and convert between the power supply network description and the HDL description during runtime using the value converter to synchronize the power supply network description and the HDL description of the power supply responsive to the mismatch.

The instructions to generate the value converter may further include instructions to: assign a direction to the supply pin of the analog circuit portion, the direction being selected from a group including: a power supply network to HDL direction (UPF2HDL); and an HDL to power supply network direction (HDL2UPF); responsive to assigning the direction of the supply pin as UPF2HDL, when an HDL driver is present, generating the value converter to propagate a voltage value from the HDL description of the power supply to the supply pin, otherwise generating the value converter to propagate a voltage value from the power supply network to the supply pin; and responsive to assigning the direction of the supply pin as HDL2UPF, generating the value converter to propagate a voltage value output by the analog circuit portion to the HDL description of the power supply and to the power supply network description of the power supply.

The instructions to generate the value converter may further include instructions that, when executed by the processor, cause the processor to: detect two different variables representing a voltage of a supply pin of the analog circuit portion of the mixed-signal integrated circuit design, the two different variables being defined based on the power supply network description and the HDL description; generate an assertion function that the two different variables have a same value; and insert the assertion function into the representation of the mixed-signal integrated circuit design.

The value converter may be associated with a boundary port of the analog circuit portion of the mixed-signal integrated circuit design, and the instructions to generate the value converter may further include instructions that, when executed by the processor, cause the processor to: parse an HDL representation of the value converter; determine a power intent associated with the boundary port based on the power supply network description; assign a plurality of power supply definitions including a power voltage and a ground voltage to the value converter based on the determined power intent; and configure the value converter based on the power supply definitions.

The power intent of the boundary port may be specified based on one or more of: one or more of a supply network and a port attribute of the boundary port specified in the power supply network description the boundary port; the analog circuit portion associated with the boundary port is associated with a specified power intent associated with the analog circuit portion; and the analog circuit portion associated with the boundary port is associated with a power domain.

According to one embodiment of the present disclosure, a non-transitory computer readable medium including stored instructions, which when executed by a processor, cause the processor to: receive a representation of a mixed-signal integrated circuit design including an analog circuit portion and a digital circuit portion including a plurality of descriptions of a power supply, the descriptions including a power supply network description and a register transfer level (RTL) hardware description language (HDL) description; determine a mismatch between the power supply network description and the HDL description of the power supply; generate a value converter to convert a voltage value associated with the power supply between the power supply network description and the HDL description; and convert between the power supply network description and the HDL description during runtime using the value converter to synchronize the power supply network description and the HDL description of the power supply responsive to the mismatch.

The instructions to generate the value converter include instructions which, when executed by the processor, cause the processor to: assign a direction to the supply pin of the analog circuit portion, the direction being selected from a group including: a power supply network to HDL direction (UPF2HDL); and an HDL to power supply network direction (HDL2UPF); responsive to assigning the direction of the supply pin as UPF2HDL, when an HDL driver is present, generate the value converter to propagate a voltage value from the HDL description of the power supply to the supply pin, otherwise generate the value converter to propagate a voltage value from the power supply network to the supply pin; and responsive to assigning the direction of the supply pin as HDL2UPF, generate the value converter to propagate a value output by the analog circuit portion to the HDL description of the power supply and to the power supply network description of the power supply.

The instructions to generate the value converter may further include instructions that, when executed by the processor, cause the processor to: detect two different variables representing a voltage of a supply pin of the analog circuit portion of the mixed-signal integrated circuit design, the two different variables being defined based on the power supply network description and the HDL description; generate an assertion function that the two different variables have a same value; and insert the assertion function into the representation of the mixed-signal integrated circuit design.

The value converter may be associated with a boundary port of the analog circuit portion of the mixed-signal integrated circuit design, and the instructions to generate the value converter may further include instructions that, when executed by the processor, cause the processor to: parse an HDL representation of the value converter; determine a power intent associated with the boundary port based on the power supply network description; assign a plurality of power supply definitions including a power voltage and a ground voltage to the value converter based on the determined power intent; and configure the value converter based on the power supply definitions, and wherein the power intent of the boundary port is specified based on one more of: one or more of a supply network and a port attribute of the boundary port specified in the power supply network description; the analog circuit portion associated with the boundary port is associated with a specified power intent associated with the analog circuit portion; and the analog circuit portion associated with the boundary port is associated with a power domain.

The instructions to generate the executable code further include instructions that, when executed by the processor, cause the processor to compile the value converter to executable machine code.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

Figure 1:
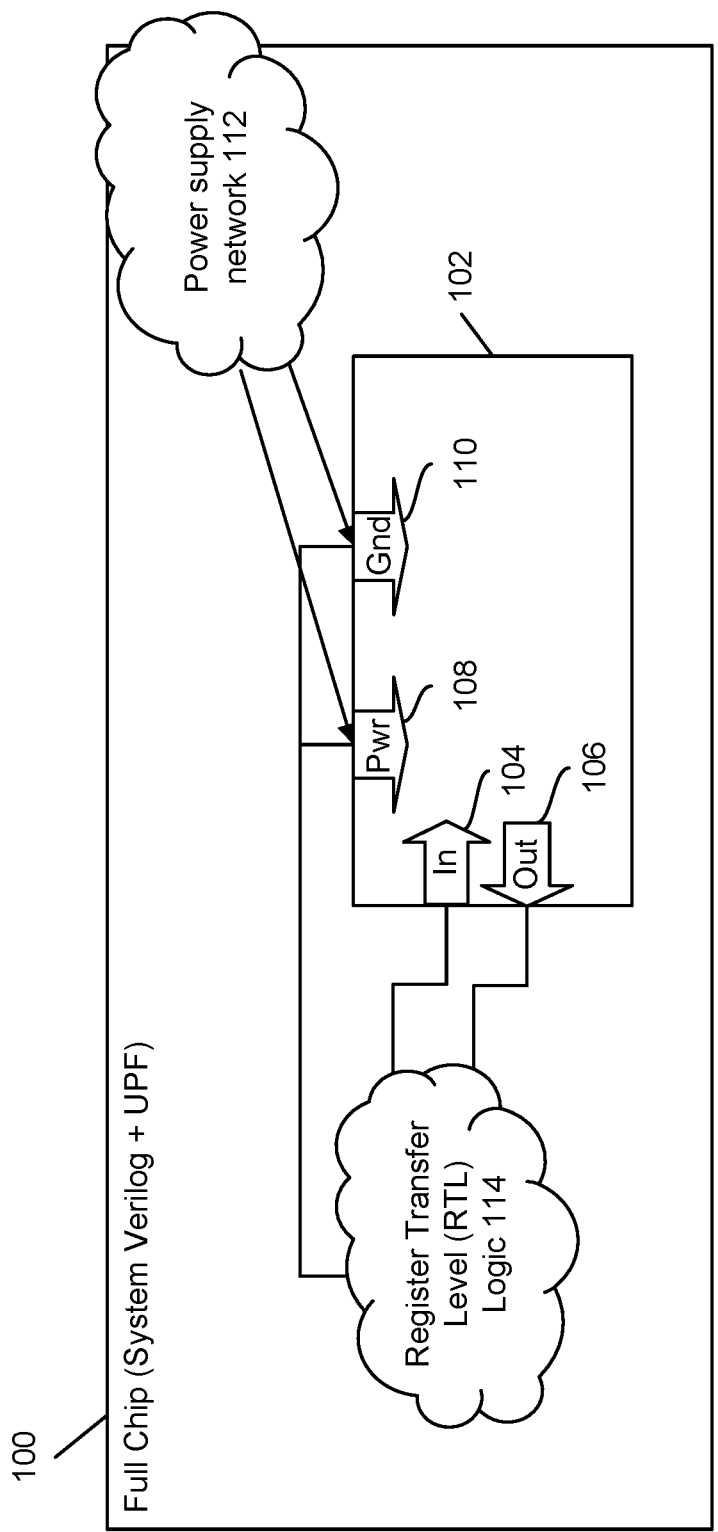
FIG. 1 illustrates an example of a full, mixed-signal integrated circuit ("full chip") connected to a test bench, where the full chip design includes register transfer level (RTL) logic and a power supply network defining power intent of the design of the full, mixed-signal integrated circuit according to one embodiment of the present disclosure.

In such various figures, reference signs may be omitted as is consistent with accepted engineering practice. However, one of ordinary skill in the art will understand that the illustrated components are readily understood when viewed in the context of the illustration as a whole and the accompanying disclosure describing such various figures.

DETAILED DESCRIPTION

Aspects of the present disclosure relate to power aware real number modeling in dynamic verification of mixed-signal integrated circuit designs.

Mixed-signal integrated circuits are integrated circuits that include portions that operate in the digital domain and portions that operate in the analog domain. The signals (e.g., voltages) in circuits or circuit portions that operate in the digital domain take on only two different logical values or discrete levels (usually referred to as 1s and 0s), where the two different values are represented by different voltages—a logic high voltage and a logic low voltage. On the other hand, signals in circuits or circuit portions operating in the analog domain may have any continuous voltage level (e.g., any voltage between 0 volt (V) to 5 V), as opposed to being restricted to particular discrete levels. (In practice, the logic high voltage and the logic low voltage have some tolerance and can fall within a range of acceptable voltages, with voltages that fall between these two ranges are invalid. For example, the range of 0 V to 2 V may correspond to the logic low voltage, the range of 3 V to 5 V may correspond to logic high voltage, and the range of 2 V to 3 V may be considered invalid.)

As one example of a mixed-signal integrated circuit, driving circuits for smartphone display panels may receive digital information representing the images to be displayed on a screen and convert the received digital signals into analog voltages that control the brightness of light emitted by the individual pixels of the display. As another example of a mixed-signal integrated circuit, a radio transceiver integrated circuit may be used to connect a smartphone to a cellular tower by processing analog signals received through the antenna of the smartphone in order to decode the digital information encoded therein and provide the decoded digital information (e.g., a text message) to the smartphone operating system to display to the user. Other examples include integrated circuits (or "chips") for processing analog sensor outputs into digital information (e.g., thermometers, accelerometers/gyroscopes, digital camera sensors, etc.) and for digital communications (e.g., wireless communications including cellular, WiFi, Bluetooth®, and near field communications, and wired communications such as Ethernet).

As one part of designing an integrated circuit, the high level functions of various circuit portions are specified using a high level description language or hardware description language (HDL) such as SystemVerilog or VHDL. This allows designers or engineers to work more efficiently by connecting together circuit portions (or modules) based on the behavior of those circuit portions (e.g., specified inputs and outputs of the circuit portions), rather than having to understand the details of how the underlying circuit portions perform those functions. In addition, this layer of representation allows teams of designers or engineers to work at different levels of the design at the same time. For example, one designer working on the architecture of the full chip may consider the arrangement of different circuit portions of the chip based on agreed-upon specified behavior of those circuit portions, while other designers concurrently work on designing circuit portions to implement the agreed-upon behavior. These circuit portions or modules may form a library of circuit portions that designers working at higher levels can choose from when implementing their designs. The behavior of a circuit portion may be defined in a standardized format, such as the Liberty format, which expresses specifications of the circuit portion or cell (e.g., timing information, power estimation, area, functionality, operating condition, and the like) in plain text (e.g., ASCII text) that can be automatically parsed by software systems for designing these integrated circuits.

In the process of designing circuits, dynamic verification or functional verification may be performed on circuit portions and/or the full integrated circuit in order to determine whether the "design-under-test" (DUT) performs as intended. For example, test inputs may be supplied to the DUT to ensure that the DUT produces outputs matching the designed behavior. As a simple example, a circuit may be designed to take two numbers as input and output the sum of those two numbers. To test the design, test inputs (e.g., various pairs of numbers) may be supplied as inputs to the DUT and the output of the DUT may be compared with the expected result (e.g., ensure that the circuit outputs the value 8 when given the numbers 3 and 5 as input).

Dynamic verification includes at least simulation and emulation. Simulation generally relates to the modeling DUT in software (e.g., entirely within a computer system) and simulating the operations performed by the various circuit portions of the circuit as simulated logical signals are propagated through the circuit. In contrast, emulation generally relates to using the design to configure programmable logic or other hardware (e.g., a field programmable gate array (FPGA)) to implement the design of the DUT, which may then operate to perform the functions specified in a design. Emulation is generally much faster than simulation (because hardware is being configured to perform the design), but is generally more expensive than simulation due to the need to use specialized hardware. Emulation generally runs much more slowly than a final, fabricated integrated circuit.

When performing dynamic verification of a digital circuit portion, it can be assumed that all of the signals appearing in the digital circuit portion are binary values (e.g., 1s and 0s), and therefore these discrete values (e.g., binary values) may be used to perform the simulation or emulation of the DUT.

However, because the signals appearing within analog circuit portions of the circuit may take on voltage values represented by real numbers (e.g., floating point values), discrete logical values or binary values (e.g., 1s and 0s) generally do not provide enough information to create an accurate simulation of these analog blocks. To address this issue, some high level description languages provide real number modeling functionality, which allows the simulated signals to take on values represented using real numbers, such as floating point numbers (e.g., 0.356 V), rather than being constrained to logical values (e.g., 1s or 0s).

An integrated circuit generally receives power through various power supply input pins. Power supply rails extending through the integrated circuit deliver power to various circuit portions (or sub-circuits) within the integrated circuit. The power supply voltages generally include a high voltage referred to as power (or VDD) and a low voltage referred to as ground (or VSS). In a real world circuit, the voltage provided by the power supply may change gradually over time or fluctuate during operation. For example, an integrated circuit may be designed to operate in multiple different power modes, such as a high performance mode, which operates at a higher voltage and higher frequency (or clock speed), and a power saving mode, which operates at a lower voltage and lower frequency (or clock speed). This ability to change the voltage and/or frequency of operation is sometimes referred to as dynamic voltage and frequency scaling (DVFS). As another example, the voltage output by a power supply can vary based on the amount of current being output by the power supply (e.g., where higher current draw corresponds to lower voltage output).

In a mixed-signal circuit, changes in the power supply voltage affect the particular analog voltages that are provided as input to the analog circuit portions, the particular analog voltages that are output by the analog circuit portions, and how various analog voltages may be interpreted as logical (e.g., digital) values (or vice versa).

Therefore, it would be beneficial for systems implementing dynamic verification of mixed-signal circuits to model the behavior of analog circuit portions in a power aware manner, that is, to account for variations in the voltages provided by the power supply.

Unified Power Format (UPF) is one way of specifying power distribution and power control information for a design-under-test (DUT), and the specification of power distribution for the full chip is referred to as a UPF supply network or power supply network. The power supply network may specify the power intent of different circuit portions within the circuit, where the power intent may refer to the power supply voltages applied to the boundary pins of analog circuit portions (modeled using RNM) within the circuit and signals for controlling of the delivery of the respective power supply voltages to various circuits or circuit portions. Library cells may define their designed power intent (e.g., specifications of the power supply voltages they expect to receive) in a standardized format, such as in a Liberty file. (A Liberty file includes information defining characteristics of a library cell, such as process, voltage, and temperature (PVT) characterization, input and output characteristics, and timing, power, and noise parameters associated with a library cell in a particular semiconductor technology. Some of these parameters may be obtained by simulating the circuit cell under various conditions and may be provided by the designer of the underlying module.) A design circuit portion that includes both the RTL specification of its functionality and a specification of power intent (e.g., in Liberty format) may be referred to as a database cell or DB cell.

When performing RNM simulation in the presence of a power distribution and control, one challenge is establishing connections between the power supply network (e.g., as specified using UPF) and the supply pins (receiving power and ground voltages from the power supply) of various RNM analog circuit portions modeled with RNM. The intended connections for supply pins in a circuit portion are defined via connect_supply_net (CSN) commands in the UPF specification. However, the power supply is partially routed in the RTL, even though there are corresponding representations of the same power supplies in the power supply network. In addition, the supply pins of the analog circuit portions should be connected to the power supply network in order to complete the power intent of the circuit in order for the power supply network (e.g., the UPF intent) to be able to correctly guide the simulation system to infer requirements of isolation cells, level shifter cells, and the like (e.g., specialized circuits for performing conversions of power voltages at the boundaries of the circuit portions) at the boundary of the data pins of the analog circuit portions.

In other words, the voltages to be supplied to power pins of analog circuit portions are specified in two different ways: in the UPF format and in the DB cell (e.g., the RTL specification and the Liberty specification of the cell). This sometimes leads to conflicts, such that the dynamic verification system may be unable to determine the correct power supply voltage to be supplied to a given circuit portion. This can be a problem when the RTL description of the analog circuit portions modeled using RNM is fully power aware in that real number analog voltages of the analog circuit portions depend on the voltage of the power supply.

As one concrete example of this problem, the supply pins of the analog circuit portions modeled using RNM receive values from a complex SystemVerilog test bench, which cannot be modeled in UPF format. As a result, UPF power supplies do not receive the same values as the RTL power supplies during the simulation. This conflict makes it difficult for a dynamic verification system (e.g., a simulation system) to interpret the values (e.g., voltage values) supplied into and out of the analog circuit portion in its communications with other circuit portions of the integrated circuit.

Another challenge for dynamic verification of mixed-signal integrated circuits is correctly modeling signals crossing a digital-to-analog boundary or an analog-to-digital boundary at the boundary pins (e.g., data pins) of the analog circuit portions. For example, a logical one (1) value generated by a digital circuit portion may be supplied to the input pin of real number modeled analog circuit portion and therefore the logical value is converted to an analog value (e.g., a particular analog voltage) that depends on the power supply voltage and, in some cases, level shifter cells connected to the input pin of the real number modeled analog circuit portion.

For any practical design process, the design of the RNM models of the analog circuit portions is completed much later in the verification flow, by which time the overall chip behavior has already been modeled using a hardware description language (HDL) such as SystemVerilog RTL, where a behavioral RTL model was used to represent the functions of the analog circuit portion (e.g., as a black box defining the behavior of the analog circuit portion, without simulating the underlying circuit elements of the analog circuit portion that implement the specified behavior). Once the RNM model for the analog circuit portions arrives (e.g., further providing a definition of how the analog circuit portion performs its defined functions), the behavioral RTL model (a black box model) of the analog circuit portion is replaced with the RNM model (e.g., a more realistic model). At this point in the design verification process, the data pins of the modeled analog circuit portions are modeled using real-valued modeling constructs or data types such as "real," "real-nettype," or "wreal," as defined in SystemVerilog language, in order to represent analog or continuous values (e.g., voltage values). However, the RTL logic that transmits or receives values to and/or from these data pins is typically modeled using "wire," "logic," or "bit" data types, which are used to represent digital or discrete values (e.g., 1s and 0s).

Dynamic verification systems such as simulators and emulators therefore use a value conversion mechanism to establish connections between these modeled analog circuit portions and the digital RTL environment and convert between digital data types (e.g., "wire," "logic," or "bit") and analog data types (e.g., "real," "real-nettype," or "wreal"). Dynamic verification systems typically insert user-defined type converter modules at real-logic boundaries. However, these converter modules generally do not consider dynamic voltages of the UPF power supplies while converting between data types (e.g., converting from digital values to analog values or vice versa), which may lead to incorrect results when the voltages of the UPF power supplies do not match the assumptions of the converter modules. Accordingly, these incorrect results may cause the dynamic verification process to fail to detect certain types of design errors or bugs, e.g., when the DUT is a mixed-signal integrated circuit.

Aspects of embodiments of the present disclosure relate to methods, and systems implementing methods for automatically detecting and resolving conflicts (or inconsistencies or mismatches) between different aspects of the power design for a mixed signal integrated circuit (e.g., power design as specified by UPF versus HDL) without requiring users (e.g., designers) to modify the RTL under verification and/or without modifying a UPF test bench.

In more detail, some aspects relate to automatically detecting mismatches between different specifications of a power supply (e.g., as described using universal power format (UPF) and a hardware description language (HDL)) for one or more circuit portions of an integrated circuit design. Some additional aspects relate to value conversion functions that automatically convert between different formats during runtime (e.g., while running a simulation or when configuring an emulation system), such as converting between digital signals and analog signals in a manner that is responsive to the specifications of the power supplies.

In some embodiments, a dynamic verification system automatically determines whether the supply pins of a modeled analog circuit portion are connected in a fully routed design and, based on this determination, selects between conflicting power supply specifications (e.g., from UPF versus RTL generated from HDL specifications). In some embodiments, the dynamic verification system also automatically generates assertions (or assertion functions) regarding power specifications or conditions that may help the user (e.g., a verification engineer) to modify the UPF-test bench whenever the RTL-supplies and the UPF-supplies differ. These assertions may be triggered and generate notifications to a user whenever there is a mismatch between RTL supply and UPF-supply. Accordingly, the user may correct the test bench for verification based on warnings generated by these assertions.

Some embodiments relate to an efficient mechanism to convert values automatically between UPF-supply-network and real-number values. The mechanism described herein may be performed without the insertion of converter modules to convert values between UPF-supply-network and real-number values within the DUT. Accordingly, improvement in memory consumption and processor time during the simulation may be realized by the dynamic verification system and better performance may be achieved. In accordance with some embodiments, relevant UPF-supplies during the conversion may be automatically considered during value conversion, which may enable a seamless integration of power-intent during a functional simulation.

In accordance with some embodiments, the dynamic verification system may generate notifications (e.g., to notify a verification engineer) when there is a discrepancy between different power supplies (e.g., the routed RTL-supplies and the UPF-supplies). The simulator may also produce correct voltage values when a signal (e.g., an RNM signal) crosses between an analog domain and a digital domain (e.g., between analog and digital circuit portions). The dynamic verification system may be able to correctly infer isolation gates due to the UPF-CSN (Unified Power Format-connect supply net) connections to the supply-pins of the analog circuit portions modeled using RNM. Accordingly, the present system may validate the RNM designs in the presence of power supplies specified using UPF.

Resolving the conflicts or mismatches between different descriptions of the power supply enables dynamic verification systems to simulate or emulate the operation of mixed-signal integrated circuits in a manner that more accurately reflects the behavior of a real, fabricated mixed-signal integrated circuit implementing the design (e.g., a fabricated chip in accordance with the design). In particular, embodiments of the present disclosure integrate multiple different sources of information regarding the specifications of power supplied to an integrated circuit and power supply expectations or requirements of circuit portions within a mixed-signal integrated circuit in a manner that enables simulation of the operation of the mixed-signal integrated circuit, in particular the behavior of analog circuit portions therein. Comparative dynamic verification systems are unable to perform this integration of information or may generate results that significantly diverge from the behavior of a real-world, mixed-signal integrated circuit implemented in physical hardware. Therefore, embodiments of the present disclosure enable particular types of errors (or "bugs") in the design of a mixed-signal integrated circuit to be detected in a verification phase of the integrated circuit design process. On the other hand, comparative dynamic verification systems may fail to reveal such design errors in mixed-signal integrated circuit designs, which would not appear until later in the design cycle, such as after incurring the high expense of fabricating a hardware prototype of the integrated circuit.

Advantages of the present disclosure include, but are not limited to: increased accuracy of simulation and emulation of mixed-signal integrated circuit designs by accurately incorporating the best available power intent at the time of the simulation or emulation of analog circuit portions of the mixed signal design; and automatic detection of inconsistencies in the specifications of power supply voltages provided to circuit portions the mixed-signal integrated circuit design. These improvements allow errors or bugs in the mixed-signal integrated circuit design to be detected earlier in the design and verification process, thereby saving computational resources and engineering resources that might be spent on simulating, emulating, and/or fabricating a flawed design.

FIG. 1 illustrates an example of a full, mixed-signal integrated circuit connected to a test bench, where the full chip design includes register transfer level (RTL) logic and a power supply network defining power intent of the design of the full, mixed-signal integrated circuit according to one embodiment of the present disclosure. As shown in FIG. 1, the design of the mixed-signal integrated circuit (or "full chip") 100 includes a real-number-modeling (RNM) circuit portion 102 modeling an analog circuit portion or analog circuit in the full chip 100. Real number modeling (RNM) is a process of modeling the behavior of an analog circuit behavior as a signal flow model. Every output of an analog circuit is discretely sampled, from the inputs and the internal states, where real numbers (e.g., floating point values) are used to represent voltages (e.g., input, output, and internal voltages). The RNM detects an event and decides the time to carry out a computation. Models written using RNM features generally do not incorporate solvers, but instead typically use functions to represent the behavior of analog circuits, and therefore typically run with less computational overhead than lower level analog models such as SPICE (Simulation Program with Integrated Circuit Emphasis). The analog circuit portion has an input signal port (or input signal pin) 104 and output signal port (or output signal pin) 106 are shown. The analog circuit portion 102 also includes power supply pins (or "supply pins"), which include a power pin or power connection 108 (e.g., a high voltage VDD supply pin) and a ground pin or ground connection 110 (e.g., a low voltage VSS supply pin). A power supply network 112, which may be defined in a format such as the unified power format (UPF), defines the power intent of the mixed-signal integrated circuit, such as the power domain of the analog circuit portion 102 (e.g., the particular voltages to be supplied to the power connection 108 and the ground connection 110). In addition, register transfer level (RTL) logic 114 defines various circuit portions within the full chip 100 as well as the connections between those circuit portions, including the analog circuit portion 102. The RTL logic 114 may be generated from specifications defined using a hardware description language (HDL) such as SystemVerilog. As seen in FIG. 1, the voltages to be supplied to the power connection 108 and the ground connection 110 may be controlled by both the power supply network 112 and by the RTL logic 114, which, in some circumstances, may lead to conflicting results.

Accordingly, aspects of embodiments of the present disclosure relate to resolving conflicts between multiple power specifications of the same pins of RNM circuit portions (e.g., analog circuit portions) during dynamic verification (e.g., simulation or emulation) of a design of a mixed-signal integrated circuit. Resolving these conflicts provides accurate real-valued supply voltages to the modeled analog circuit portions such that a dynamic verification system can accurately model the internal dynamics of the analog circuit portion and therefore generate accurate logical output values and/or accurate real valued (or analog output values) based on the real-valued power and ground voltages. Therefore, embodiments of the present disclosure enable dynamic verification processes to more accurately model the real-world behavior of a mixed-signal integrated circuit in accordance with the design.

In the following discussion, various embodiments will be described in detail the context of a dynamic verification system including a SystemVerilog test bench used to simulate a mixed-signal integrated circuit based on a design specified using SystemVerilog and a power supply network specified using unified power format (UPF). However, embodiments of the present disclosure are not limited thereto. As noted above, dynamic verification systems and methods are not limited to simulation, and therefore some embodiments of the present disclosure include corresponding techniques applied to other systems and methods for dynamic verification, such as emulators and emulation.

Figure 2:
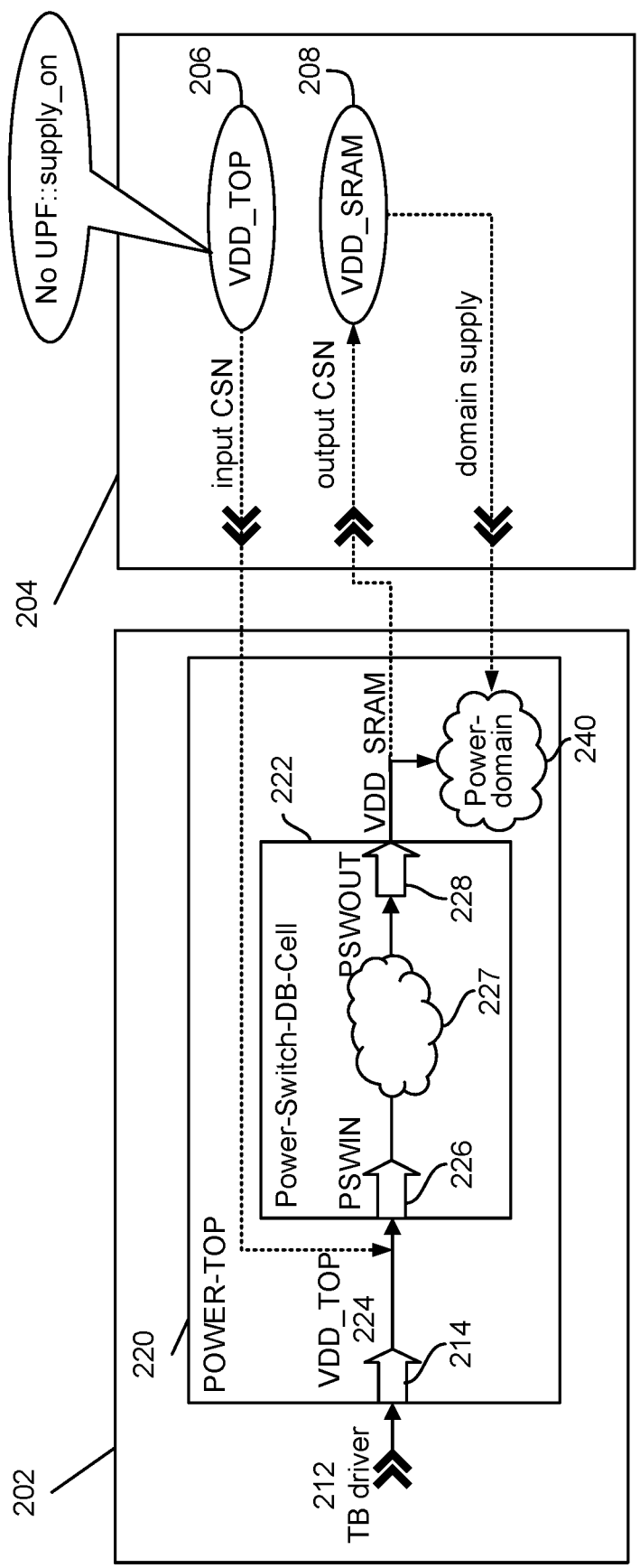
FIG. 2 illustrates a specific example of a real number modeling (RNM) design scenario.

FIG. 2 illustrates a specific example of a real number modeling (RNM) design scenario including a PG (power and ground) routed design scenario for a mixed-signal integrated circuit design with connections to supply pins of an analog circuit portion. In more detail, FIG. 2 illustrates a test bench 202 (e.g., implemented in an HDL such as SystemVerilog) and a supply network or power supply network 204 (e.g., a UPF supply network). The test bench 202 includes a DUT 220 (labeled "power-top") which includes an analog sub-circuit portion 222. The analog sub-circuit portion 222 implements a power switch circuit portion as shown in FIG. 2, which takes an input supply voltage VDD_TOP from the DUT 220 at input pin PSWIN 226, and supplies the received voltage through an analog circuit 227 to generate an output supply voltage VDD_SRAM at output pin PSWOUT 228, which is supplied to a power domain 240 in the DUT 220 to, for example, power a static random access memory (SRAM) circuit portion in the DUT 220.

A power domain 240 refers to a portion of the circuit that operates under particular power conditions. An integrated circuit may be designed to have multiple power domains, where different power domains may have different nominal power voltages (e.g., 5 V versus 3.3 V) and may be controlled independently (e.g., adjust the power voltages to higher or lower voltages or powered off entirely).

In the particular design shown in FIG. 2, the input pin PSWIN 226 and the output pin 228 of the analog sub-circuit portion 222 is specified or described in two ways: the input pin PSWIN 226 is connected to the test bed (TB) driver 212 through an input pin 214 of the power-top or DUT 220; and the power supply network 204 specifies a connection between the UPF-supply-pad VDD_TOP 206 and the input pin PSWIN 226 of the analog circuit portion 222, as shown by the dotted line. Likewise, the analog circuit portion 222 is configured to generate an output supply voltage VDD_SRAM, which is connected to the power domain 240 in the RTL specification, as shown by the solid line, and the output supply voltage VDD_SRAM is also defined by a corresponding pad 208 of the power supply network 204. This leads to a potential conflict because the RTL-supply-nets are driven by a test bench driver 212 of the test bench 202.

The power supply network 204 does not specify parameters of the power supply inside the analog circuit portion (or DB cell) 222. The supply-information for the analog circuit portion 222 may be specified using a liberty file, an example of which is shown below in Table 1.

TABLE 1

```
// Example Liberty format
cell (IP) {
    pg_pin (vdd) { pg_type : primary_power }
    pg_pin (vss) { pg_type : primary_ground }
    // logic pin
    pin (I) { related_power_pin : vdd; related_ground_pin: vss }
}
```

According to the liberty file, the pins of the analog circuit portion may be classified into supply-pins (pg_pin (vdd) and pg_pin (vss), in the example of Table 1 above) and logic-pins (pin (I), in the example of Table 1 above). The direction and PG-type of a pin may be described in the same specification. The specification may also define a relationship or association between a logic pin and its related supply pins. In the example shown in Table 1 above, pin (I) has a related power pin (related_power_pin: vdd) and a related ground pin (related_ground_pin: vss). These associations between logic pins and supply pins specify the relationship between logical signals and corresponding voltages at the logic pin (I). For example, a logical signal with a logical high value at the logic pin is specified as a voltage corresponding to a voltage of the related power pin (e.g., vdd) and a logical signal with a logical low value at the logic pin is specified as a voltage corresponding to a voltage at the related ground pin (e.g., vss). Likewise, a voltage near the voltage of the related power pin (e.g., vdd) at the logic pin is specified as a logical high value and a voltage near the voltage of the related ground pin (e.g., vss) at the logic pin is specified as a logical low value.

Accordingly, some aspects of embodiments relate to systems and methods performed by a dynamic verification system to simulate (or emulate) the test bench 202 correctly, while taking into account the multiple descriptions of the power supply (e.g., the supply pins) through the test bench 202 (e.g., as described in a first format, such as a register transfer level (RTL) representation in an HDL, such as SystemVerilog) and the power supply network 204 (e.g., as described in a second format, such as UPF) without requiring the user to modify the description of the power supply network.

In more detail, when performing dynamic verification, such as simulation, the dynamic verification system inserts virtual isolation cells (or isolation gates) into the simulated or emulated design, as inferred by the description of the power supply in the power supply network 204 in the second format (e.g., UPF). These virtual isolation cells do not appear in the description of the test bench 202 in the first format (e.g., an RTL description in an HDL such as SystemVerilog) because these virtual isolation cells are typically not explicitly included by the designer of the module. Accordingly, some aspects of embodiments of the present disclosure relate to automatically aligning the values as specified from the power supply network 204 (e.g., the UPF values) with the inputs and outputs of an analog cell modeled using RNM (e.g., the power-switch the DB-cell 222 shown in FIG. 2) as received or transmitted to a digital cell (e.g., the power-top or DUT 220 shown in FIG. 2), as specified in the first format (e.g., an RTL description of the circuit).

Figure 3:
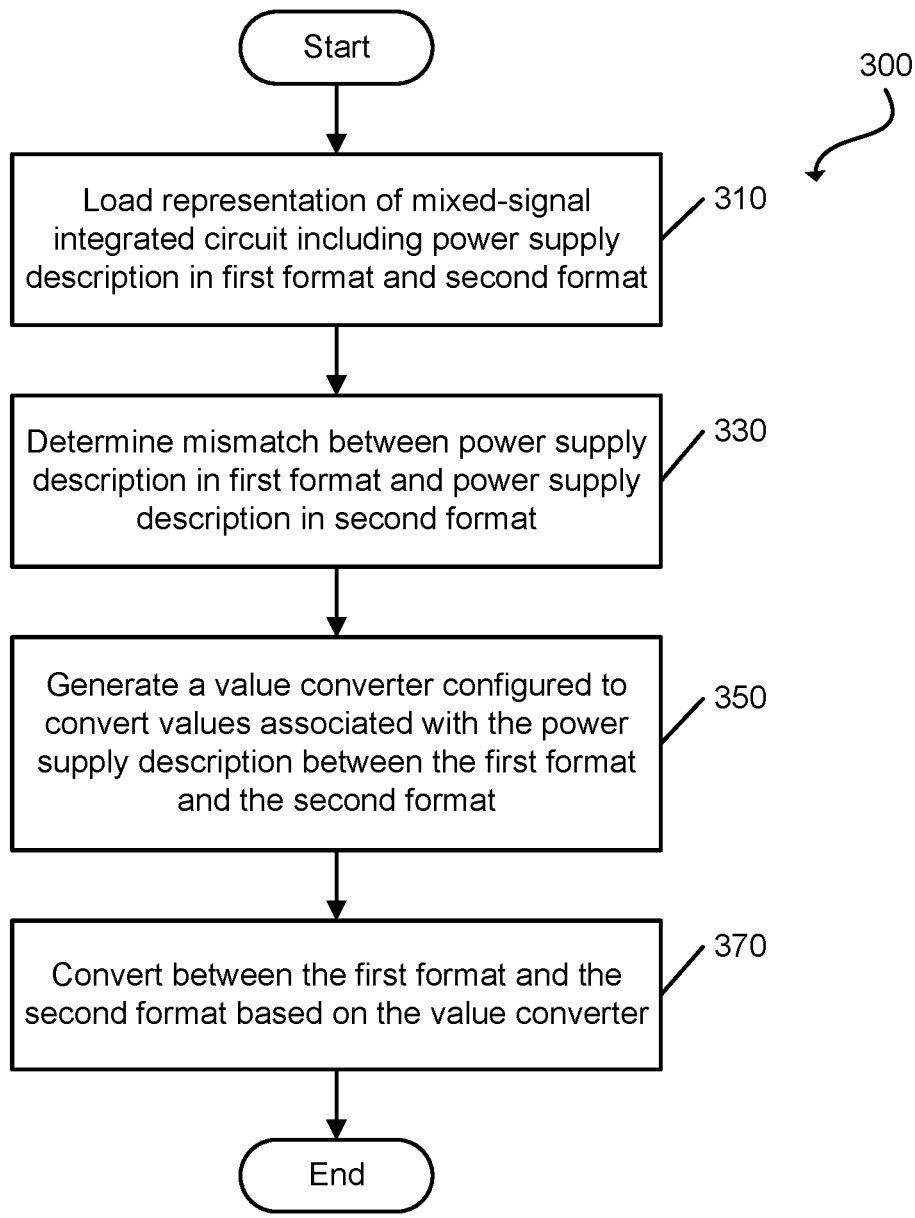
FIG. 3 is a flowchart depicting a method for resolving or synchronizing power information from multiple specifications of a power supply voltage according to one embodiment of the present disclosure.

FIG. 3 is a flowchart depicting a method for resolving or synchronizing power information from multiple specifications of a power supply voltage according to one embodiment of the present disclosure. In some embodiments of the present disclosure, the operations described in association with various methods are performed by a dynamic verification system, such as a simulation system or emulation system. For example, some aspects of embodiments of the present disclosure may be performed by an emulation environment 1000, such as by a processor and memory of a host system 1007 of the emulation environment 1000, as described in more detail below with respect to FIG. 10. As another example, aspects of embodiments of the present disclosure may be performed by a simulation system implemented using one or more computer systems such as by a processor and memory of a computer system 1100 described in more detail below with respect to FIG. 11.

Referring to FIG. 3, a method 300 for resolving or synchronizing power information from multiple specifications when performing dynamic verification of a mixed-signal integrated circuit design includes, at 310, loading, by a dynamic verification system, a representation of the mixed-signal integrated circuit design that includes descriptions of a power supply in a first format (e.g., a RTL description in an HDL) and a second format (e.g., a power supply network description such as in UPF).

At 330, the dynamic verification system determines a mismatch between a description of the power supply in a first format and a description of the power supply in a second format. For example, a first format is HDL format, and a second format is UPF. A mismatch (or conflict or inconsistency) arises when the voltage values of the power supply specified in the first format differ from the voltage values specified in the second format, such as where the power supply for an analog circuit portion is described or specified in both the HDL format and the UPF format, and these two descriptions may specify different voltage values for power and ground. In some embodiments, the dynamic verification system determines mismatches, or potential mismatches, by identifying power pins of analog circuit portions that are specified in multiple different formats or multiple different descriptions (e.g., HDL and UPF). In some embodiments, the dynamic verification system resolves any such determined mismatch between the different descriptions, e.g., an HDL description and a power supply network description of the power supply.

Figure 4A:
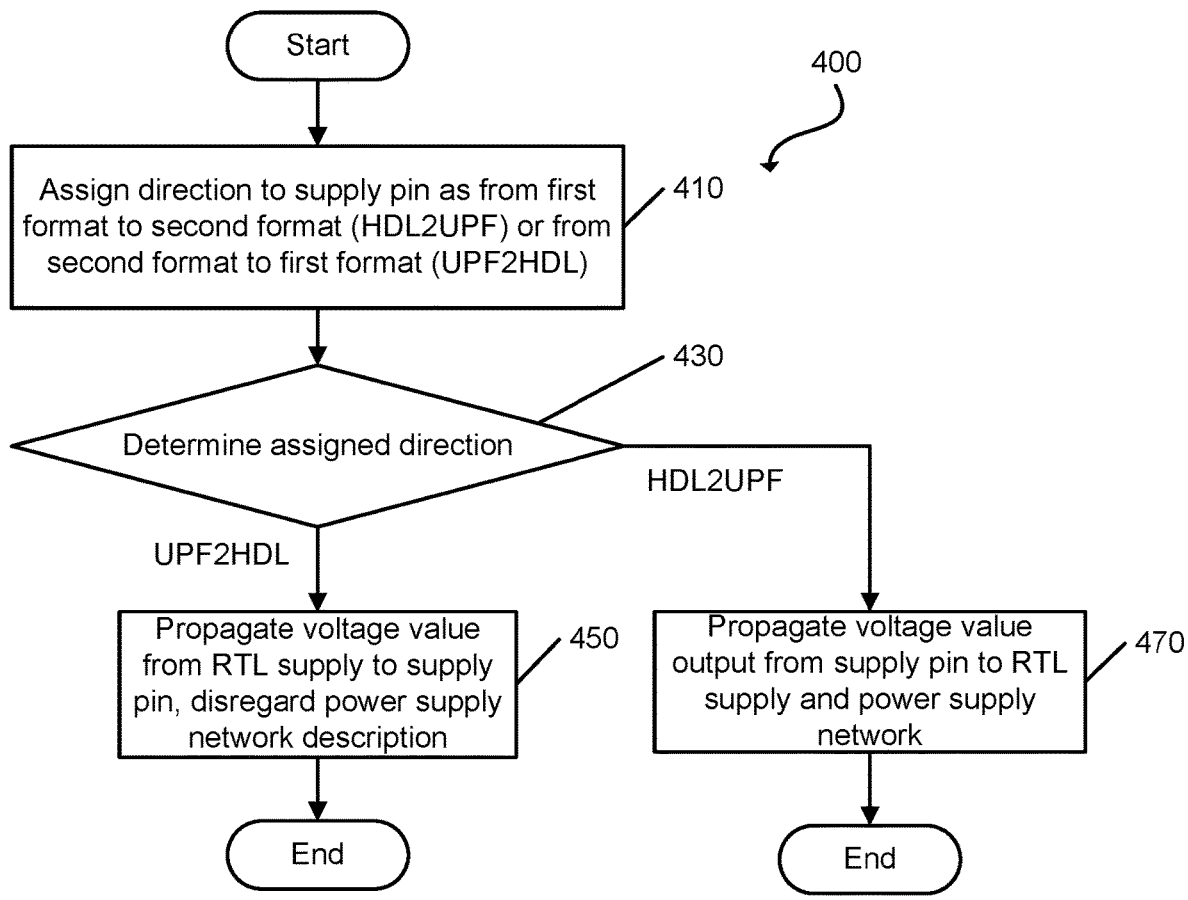
FIG. 4A is a flowchart depicting a method for resolving or synchronizing power information from multiple specifications of a power supply voltage according to one embodiment of the present disclosure.

FIG. 4A is a flowchart depicting a method for resolving or synchronizing power information from multiple specifications of a power supply voltage according to one embodiment of the present disclosure. In some embodiments, the operations shown in FIG. 4A and described in more detail below are performed as a part of determining and resolving mismatches between the power supply description in the first format and the power supply description in the second format at 330 as shown in FIG. 3.

In more detail, the method 400 shown in FIG. 4A relates to resolving or synchronizing power information from multiple specifications of one particular supply pin of an analog circuit portion (modeled using, e.g., RNM) of a mixed-signal design. However, the method 400 may be applied to multiple supply pins of an analog circuit portion and may be applied to one or more supply pins of multiple analog circuit portions in a mixed-signal integrated circuit design.

At 410, the dynamic verification system assigns a direction to the supply pin in the context of low power simulation. These directions may be referred to herein as being: from an HDL format (a first format) to a power supply network format such as UPF (a second format)— a "HDL2UPF" direction; or from the UPF format (the second format) to the HDL format (the first format)—a "UPF2HDL" direction. A "UPF2HDL" supply pin will receive its value from the UPF-supply-network, and a "HDL2UPF" supply pin will drive the UPF supply network with the real-value generated by the RNM model of the analog circuit portion.

In more detail, in some embodiments, the dynamic verification system assigns the direction of the supply pin (e.g., a supply pin currently being analyzed by the dynamic verification system) based on the PG (power/ground) direction specified by a Liberty specification associated with the DB cell (a "Liberty PG-direction," such as "INPUT," "OUTPUT," or "INOUT/INTERNAL") and a power/ground type of the pin (a "Liberty PG-type" such as "PRIMARY," "BKUP," "NWELL," "PWELL," "INTERNAL_POWER," or "INTERNAL_GROUND").

Table 2, below, describes how the direction of a supply pin is assigned at 410 by a dynamic verification system according to some embodiments:

| Liberty PG-direction | Liberty PG-type | Assigned dynamic verification direction |
|---|---|---|
| INPUT | PRIMARY/BKUP/ NWELL/PWELL | UPF2HDL |
| INPUT | INTERNAL_POWER/ INTERNAL_GROUND | HDL2UPF |
| OUTPUT | <ANYTHING> | HDL2UPF |
| INOUT/INTERNAL | PRIMARY/BKUP/ NWELL/PWELL | UPF2HDL |
| INOUT/INTERNAL | INTERNAL_POWER/ INTERNAL_GROUND | HDL2UPF |

At 430, the dynamic verification system determines the behavior of the simulation or emulation of the supply pin based on the assigned direction.

Figure 4B:
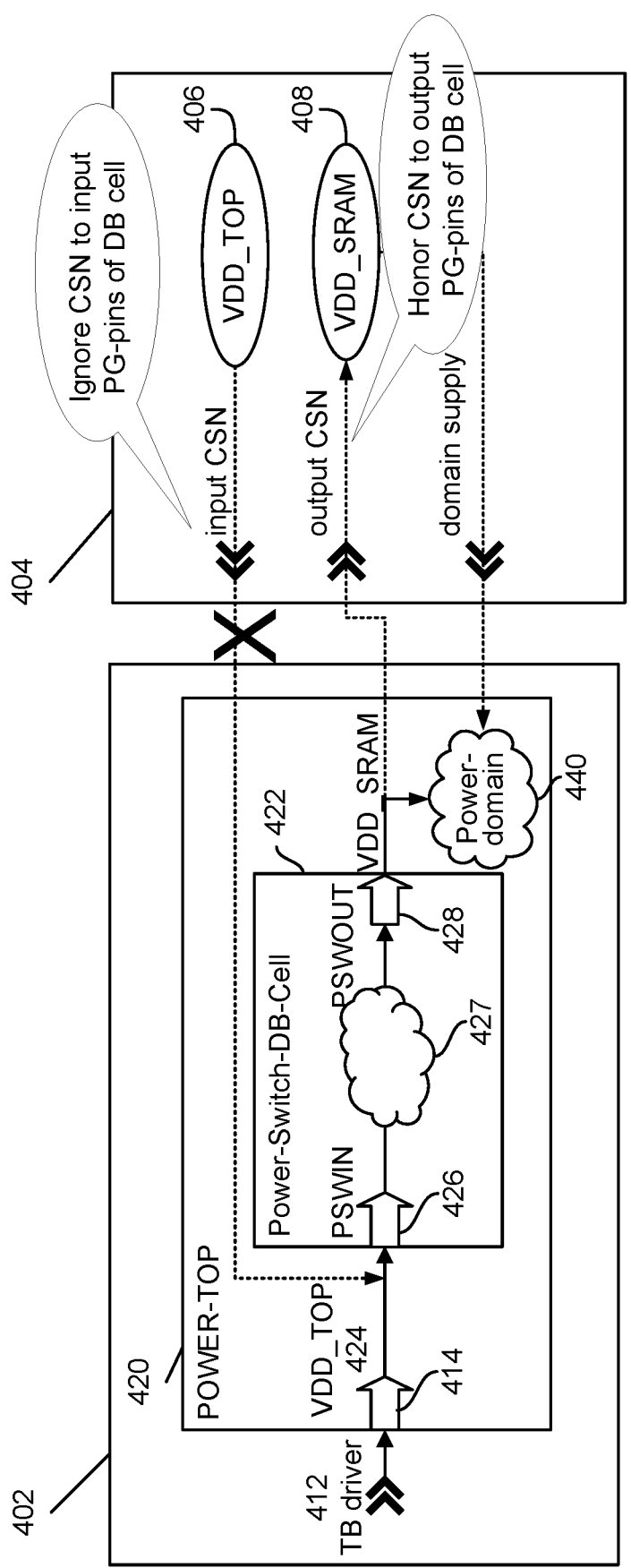
FIG. 4B illustrates the application of a method, in accordance with some embodiments, for resolving or synchronizing power information from multiple specifications of a power supply voltage to a specific example of an RNM design scenario.

FIG. 4B illustrates the application of a method, in accordance with some embodiments, for resolving or synchronizing power information from multiple specifications of a power supply voltage to a specific example of an RNM design scenario. The block diagram shown in FIG. 4B is substantially similar to that shown in FIG. 2, and therefore some details will not be repeated herein. FIG. 4B illustrates a test bench 402 and a supply network 404 (e.g., a UPF supply network). The test bench 402 includes a DUT 420 (labeled "power-top") which includes an analog sub-circuit portion 422. A TB driver 412 drives an input pin 414 of the DUT 420 with an input supply voltage VDD_TOP 424. The analog sub-circuit portion 422 implements a power switch circuit portion as shown in FIG. 4B, which takes the input supply voltage VDD_TOP 424 from the DUT 420 at input pin PSWIN 426 and supplies the received voltage through an analog circuit 427 to generate an output supply voltage VDD_SRAM at output pin PSWOUT 428, which is supplied to a power domain 440 in the DUT 420 to, for example, power a static random access memory (SRAM) circuit portion in the DUT 420.

In the case where the assigned direction was the UPF2HDL direction (e.g., from the second format to the first format), then, at 450, responsive to this determination, the dynamic verification system does not disconnect the design-driver when the supply pin is driven with a voltage value from RTL and disregards the UPF-CSN for purposes of simulation (or emulation). However, in circumstances where there is no connection to this supply-pin from RTL, the dynamic verification system does consider the specification from the power supply network (e.g., the UPF-CSN), thereby prioritizing the RTL description over the power supply description in order to resolve the conflict or discrepancy in the different descriptions of the supply pin.

In the example shown in FIG. 4B, the input pin PSWIN is labeled in the Liberty file for the DB cell 422 as an input pin and a primary pin, and therefore is assigned the UPF2HDL direction. Accordingly, when simulating or emulating the operation of the DUT 420, the dynamic verification system propagates the voltage value from the RTL design driver (TB driver 412) and disregards the voltage value from the power supply network or UPF-CSN (that is, the input CSN 406 from the supply network 404), as indicated by the X in FIG. 4B.

In the case where the assigned direction was the HDL2UPF direction (e.g., from the second format to the first format), then, at 470, responsive to this determination, the dynamic verification system propagates the voltage value of the pin to RTL supplies (e.g., in the test bench) as well as to UPF supplies (e.g., in the power supply network), thereby synchronizing the descriptions in the RTL (or HDL) format and in the power supply network format.

In the example shown in FIG. 4B, output pin PSWOUT 428 is labeled in the Liberty file for the DB cell 422 as an output pin and therefore it is assigned the HDL2UPF direction. Therefore, the dynamic verification system propagates the value output by the pin to the RTL supply (e.g., to power domain 440) as well as to the UPF supply (e.g., the VDD_SRAM pad 408), such that both the logical state of the power supply (e.g., "on" versus "off") is propagated to the power domain 440 and the analog voltage value (as represented as a real number value), is propagated to the VDD_SRAM pad 408 of the power supply network 404. This allows the power supply network 404 to transmit the correct voltage to the corresponding power domain 440 as the domain supply voltage.

The behavior described above, responsive to determining that the direction of the supply pin is UPF2HDL or HDL2UPF, is summarized in Table 3, below:

TABLE 3

| Direction of supply pin | Simulation behavior |
|---|---|
| UPF2HDL | Do-not disconnect design-driver when the supply-pin is driven from RTL and disregard the UPF-CSN for simulation purpose. The UPF-CSN may be considered only when there is no connection to this supply-pin from RTL. |
| HDL2UPF | Value of the pin propagates to RTL-supplies as well as to UPF-supplies |

Some aspects of embodiments also relate to automatically generating assertions (or assertion functions) relating to runtime consistency between the specifications or descriptions of the power supply. In more detail, these assertions may be used to detect circumstances during runtime (e.g., during simulation or emulation) where the value (e.g., voltage) of a pin, as specified by the RTL supply, differs from the value of the same supply pin as specified by the UPF supply at any point in time during the simulation, as shown in Table 3 above. In some embodiments, the dynamic verification system automatically generates assertions using UPF information model application programming interfaces (APIs). These assertions may help users to modify their test bench to model the correct low-power simulation environment. An example of such an assertion (or assertion function) is depicted in Table 4:

TABLE 4

```
upfBooleanT status;
real vdd_monitor;
initial
    status = upf_create_object_mirror("/top/power_top/vdd_top", vdd_monitor);
always @(vdd_monitor or VDD_TOP)
    assert(vdd_monitor == VDD_TOP); else fail("UPF supply and RTL supply have
    different values");
```

In some embodiments, the dynamic verification system automatically generates assertions when determining and resolving mismatches between the power supply description in the first format and the power supply description in the second format of operation 330 as shown in FIG. 3 and automatically inserts the generated assertions (or assertion functions) into the RTL description of the test bench (e.g., test bench 202) that is used to perform the simulation or emulation of the design under test (DUT).

Figure 5:
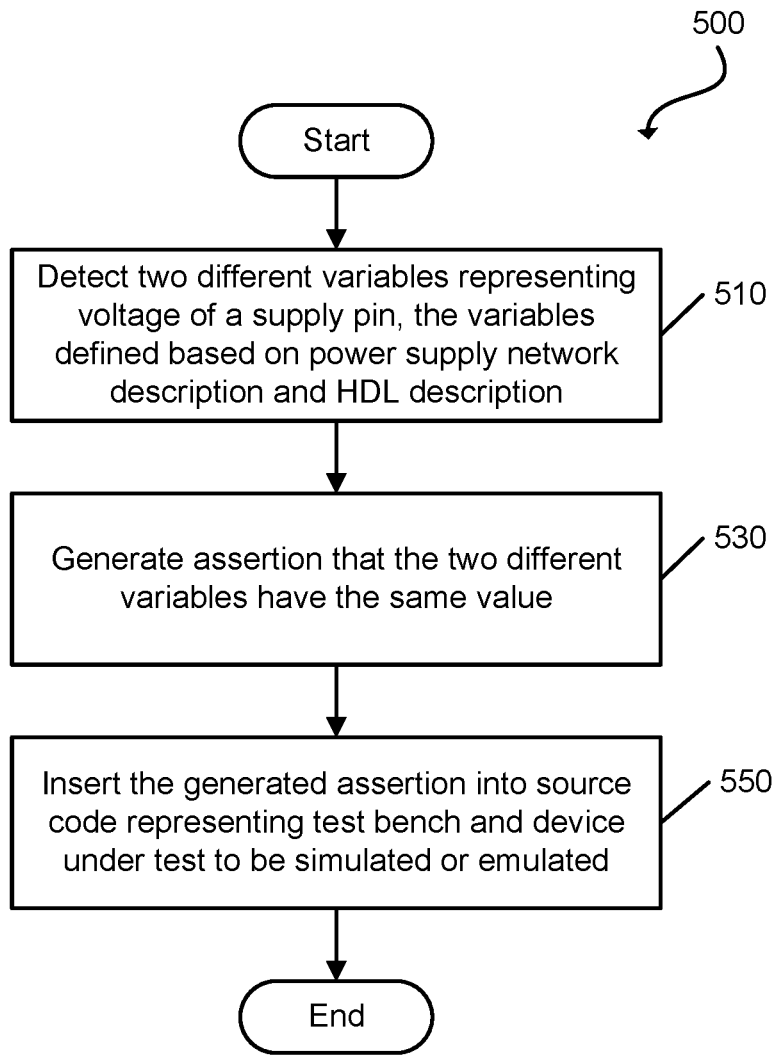
FIG. 5 is a flowchart of a method for generating assertions regarding consistency of power supply voltages in accordance with some embodiments of the present disclosure.

FIG. 5 is a flowchart of a method 500 for generating assertions regarding consistency of power supply voltages in accordance with some embodiments of the present disclosure. Table 4, above, shows examples of assertions generated automatically according to the method 500. At 510, the dynamic verification system detects two different variables representing the voltage of a supply pin (the same supply pin), where the values of the two different variables are defined based on the power supply network description and the RTL description. At 530, the dynamic verification system generates an assertion (or assertion function) asserting or testing that the two variables have the same value, and, at 550, the dynamic verification system inserts the assertion into an HDL description of the test bench.

In the above example, the dynamic verification system automatically detects that the "vdd_monitor" variable (e.g., defined in the HDL description) and "VDD_TOP" variable (e.g., defined in the power supply network description such as in UPF) represent the value of a same supply pin of an analog circuit portion. In some embodiments, the dynamic verification system performs the detection based on identifying a supply pin of the analog block as being connected to the test bench driver as specified in the HDL description and a particular voltage to be supplied to the supply pin as specified in the power supply network (e.g., as further specified in a Liberty file associated with the analog circuit portion). The dynamic verification system generates an assertion "assert(vdd_monitor==VDD_TOP);" that serves as a runtime check that these two values representing the voltage at the same supply pin are equal. The automatically generated code also includes code that generates an alert when the assertion fails (e.g., when the values are not equal), as indicated by the code: "else fail("UPF supply and RTL supply have different values");" This automatically generated assertion code is then automatically inserted into the source code, expressed in an HDL, representing the test bench and design-under-test to be simulated or emulated by the dynamic verification system.

Some aspects of embodiments of the present disclosure relate to automatically converting between digital values and analog values when simulating or emulating a mixed-signal design as signals are transmitted from a digital circuit portion to an analog circuit portion (a digital-to-analog boundary) or from an analog circuit portion to a digital circuit portion (an analog-to-digital boundary) in the RTL design. Referring back to FIG. 2, the input pin PSWIN 226 is one example of a digital-to-analog boundary because a digital power supply signal 224 from the test bench driver 212 is transmitted into an analog (e.g., RNM-modeled) circuit portion 222. Likewise, the output pin PSWOUT 228 is one example of an analog-to-digital boundary because an analog power supply voltage, generated by the power-switch DB cell 222, is output to power domain 240, which is represented as a digital circuit portion.

Some comparative techniques for performing conversions of signals at digital-to-analog or analog-to-digital boundaries relate to the use of a value conversion table (VCT) in accordance with the uniform power format language reference manual (UPF-LRM), also referred to as IEEE 1801-2015. A value conversion table is a fixed table that defines how values are mapped from UPF to RTL or from RTL to UPF. For example, a VCT may have entries that associate logical values such as logic zero (0), logic one (1), and unknown logic value (X) with corresponding analog (real number) voltage levels, such as 0 V, 3.30 V, and 1.65 V, respectively. However, table-based translation is inadequate for RNM simulation. This is because the actual power supply voltage (e.g., the analog voltage applied to a power pin) may vary based on operating conditions of the circuit, including based on operating the mixed-signal integrated circuit in a high performance mode versus a low power mode.

Accordingly, some aspects of embodiments of the present disclosure relate to a dynamic verification system that integrates customizable converters for converting values between power supplies specified based on power supply network descriptions (e.g., UPF supplies) and power supplies specified based on RTL descriptions (e.g., RTL supplies). In some embodiments, these value converters are implemented as functions in an HDL such as SystemVerilog that may be compiled to executable code, such as executable machine code, without instantiating a separate module within a simulated or emulated circuit. In some embodiments, these value converters are implemented as modules within the simulated or emulated circuit. Accordingly, as used herein, the term "value converter" is used to broadly include implementations based on functions (value conversion functions, such as compiled functions) and implementations based on modules (value conversion modules, such as simulated or emulated circuit modules).

One example of usage of a converter according to some embodiments of the present disclosure is shown in Table 5, below, which includes pseudocode for specifying a value converter between a power supply network (e.g., a UPF-supply-network) and supply-pins of one or more analog circuit portions defined in an HDL.

TABLE 5

System Verilog

// define functions in an SV-package
package pkg;
...
function real upf2real(
   input UPF::supply_net_type inp);
...

Syntax in UPF define custom-VCT for real-data-types in the UPF
create_upf2hdl_vct UPF2REAL -hdl_type {sv real} \
  -function pkg::upf2real
use these VCTs in 'CSN' command
connect_supply_net UPF_NET \
  -ports { DB_INST1/in } \
  -vct UPF2REAL As shown in the example of Table 5, embodiments of the present disclosure accept a user-defined value converter as a value conversion function ("upf2real") for a connection between a power supply network and a supply pin of an analog circuit portion (e.g., the conversion function may be associated with a particular connect_supply_net command in accordance with a standard for defining connections in UPF). The value conversion function is used by the dynamic verification system to convert values between a data type corresponding to a power supply network (e.g., UPF supply net type) and a real number data type corresponding to an HDL (e.g., a SystemVerilog real number type). As one non-limiting example, the value-conversion function may be part of the SystemVerilog package, and the value-conversion function name (e.g., "upf2real") may be specified in the UPF file to define a value-conversion mechanism (e.g., specified in the use of a "create upf2hdl_vct" function). Additional details regarding examples of implementations of a value conversion function or value converter such as "upf2real" will be presented in more detail below.

As a result, any connect_supply_net command may use the value-conversion technique such that the connections may use the user-defined SystemVerilog function. In the particular example shown in Table 5, above, the existing syntax for performing VCT-based conversions is being reused (or overloaded) to enable the specification of a value conversion function (e.g., using the "-function" flag, as shown in Table 5). However, embodiments of the present disclosure are not limited thereto and may be implemented using different syntax in accordance with various different hardware description languages (e.g., other than SystemVerilog) and syntax associated with formats for specifying power supply networks (e.g., other than UPF).

Referring back to FIG. 3, at 350, the dynamic verification system generates a value converter (such as a value conversion function or a value conversion module, according to various embodiments) to convert values associated with the power supply description between the first format (e.g., RTL format) and the second format (e.g., power supply network format).

In some embodiments, a user-defined value conversion function (e.g., defined in an HDL in accordance with Table 5, above) is used to generate executable code (e.g., compile the value conversion function into compiled executable code), where the executable code is executed at runtime (e.g., during simulation) to perform value conversions across digital-to-analog boundaries or analog-to-digital boundaries (e.g., different value conversion functions may be specified for crossing boundaries in different directions, and different value conversion functions may be specified for different circuit portions or power domains). The generated executable code is then integrated into the design that is to be simulated or emulated by the dynamic verification system, which executes the compiled value conversion function to perform the value conversion during runtime.

In some embodiments, the value conversion function is implemented as a converter module at a corresponding digital-to-analog boundary or analog-to-digital boundary, as expressed in the HDL of the test bench and the design under test and as executed by a corresponding software environment (e.g., simulator environment or emulation environment).

Some aspects of embodiments of the present disclosure relate to a mechanism for automatically converting values between different formats (e.g., a power supply network format and a real number format associated with an HDL) using state-less value conversion functions that do not require insertion of converter modules. This technique significantly improves memory consumption of the dynamic verification system during simulation (or emulation) and achieves better (e.g., faster) performance.

In more detail, in some embodiments, no converter module instantiation may be required when supply-pins of analog circuit portions (e.g., modeled using RNM) need to be driven by the power supply network (UPF-CSN). In these cases, value converters (e.g., expressed by a user in an HDL such as SystemVerilog) are compiled into functions that run natively on the processor of the computer system 1100 (performing simulation or serving as a host system 1007 of an emulation environment 1000). For example, the functions may be compiled into code in the C language (or other general purpose programming language such as C++, Rust, Ada, or the like), which may then be compiled (or interpreted and/or Just-in-Time complied) into machine code to be executed by the computer system (or the function may be compiled directly into machine code from the HDL representation of the conversion function, or the conversion function may be expressed in a general purpose programming language). As such, by implementing converter functions as stateless functions that are implemented as complied machine code, these embodiments reduce computational overhead (e.g., memory usage) associated with implementing a converter as a virtual converter module instantiated within the HDL description of the mixed-signal integrated circuit (e.g., as a virtual module within a simulated test bench). In more detail, instead of storing a converter module in memory as an object within an HDL runtime, a compiled value conversion function may be referred to using a pointer in memory, where the input value (e.g., a logical value or a real number value) is provided as input to the function (along with other arguments, as described in more detail below) and invoked at runtime on an on-demand basis to compute a converted value.

Figure 6:
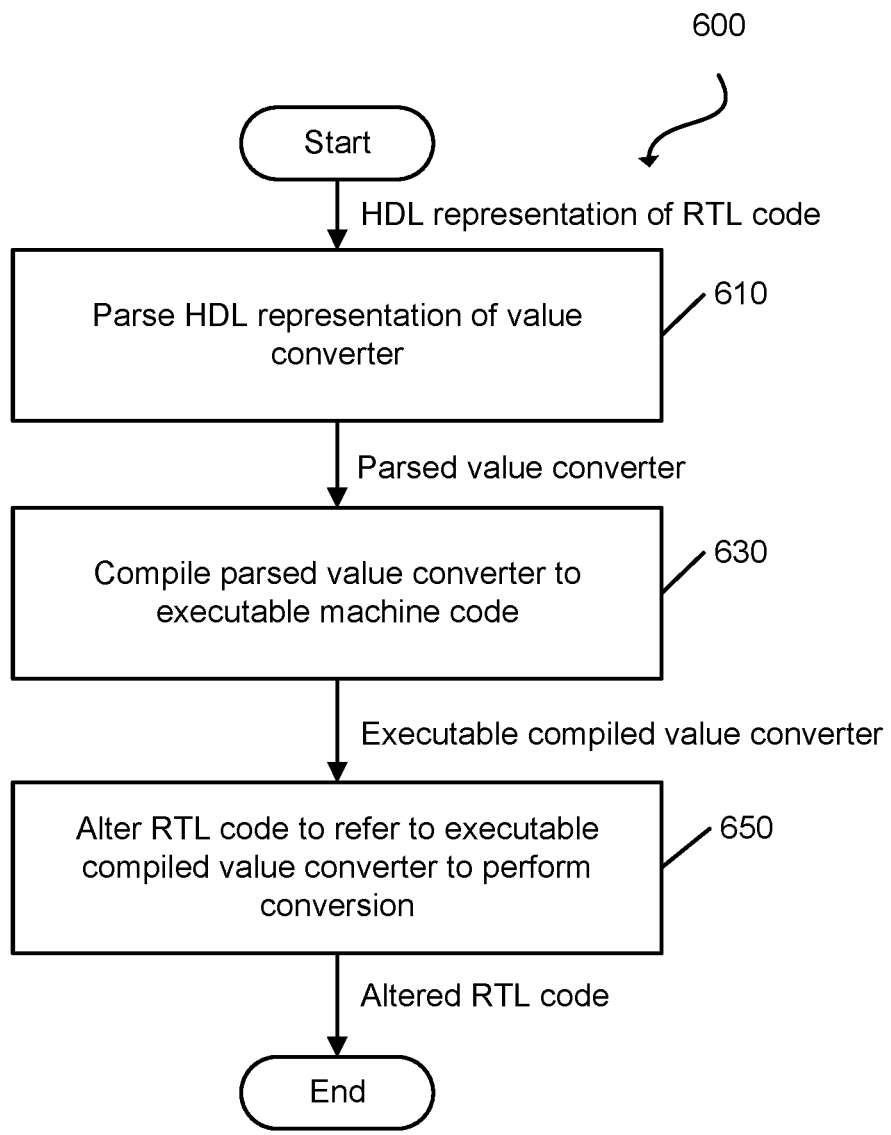
FIG. 6 is a flowchart of a method for generating a value converter for performing value conversions between a supply network and supply pins of analog circuit portions modeled using RNM in accordance with some embodiments of the present disclosure.

FIG. 6 is a flowchart of a method 600 for generating a value converter for performing value conversions between a supply network and supply pins of analog circuit portions in accordance with some embodiments of the present disclosure. At 610, the dynamic verification system parses an HDL representation of a value converter (e.g., a value conversion module or a value conversion function), which may be included within an HDL representation of RTL code modeling a mixed-signal integrated circuit. At 630, the dynamic verification system compiles the parsed value converter to generate executable machine code (e.g., by way of generating code in another programming language, such as the C programming language and supplying the C language code to a compiler to generate the machine code or by generating machine code directly from the value converter as represented in an HDL), where the executable machine code may take the form of a value converter function. At 650, the dynamic verification system alters the originally received HDL representation of RTL code to insert references (or pointers) to the executable value converter such that, during runtime, the executable compiled value converter (e.g., the value converter function) can be invoked, on-demand, to perform value conversions. For example, the alteration of the RTL code may include removing converter modules and replacing the removed converter modules with references or pointers to compiled value converter functions or may include inserting references or pointers to the compiled conversion functions at appropriate boundaries between analog circuit portions (e.g., modeled using RNM) and digital circuit portions of the mixed-signal integrated circuit design.

By way of a non-limiting example, a dynamic verification system parses a SystemVerilog description and generates an executable for the simulation model. As part of the process, the dynamic verification system parses a conversion function represented in SystemVerilog and compiles the conversion converter into corresponding executable C-code or machine code implementing a value converter function. Accordingly, no memory allocation for the converter module instances at runtime may be required, because the value converter function can be invoked using a function call, rather than simulating or emulating the behavior of a converter module (e.g., instantiated within a simulated circuit or in emulation circuit portions within a field programmable gate array of an emulation system), thereby significantly reducing the overall memory usage for simulation (or emulation).

Some aspects of embodiments relate to value converters or value conversion functions that automatically consider the relevant power supplies (e.g., from the power supply network specified using, for example, UPF) when performing value conversion, thereby seamlessly integrating power-intent during functional simulation. For example, as noted above, comparative approaches to performing conversions between logical values and real values use a value conversion table (VCT), which generally applies a fixed mapping between logical values (e.g., 0, 1, and X) and particular voltages (e.g., 0 V, 3.30 V, and 1.65 V). However, due to the fixed mappings, these comparative approaches fail to consider power-intent, as specified by the power supply network, during functional simulation, therefore generating incorrect simulation results.

In some embodiments, a logic-to-real value converter located at a digital-to-analog boundary in a mixed-signal design uses the corresponding power supply (power and ground voltages) associated with an input logic signal to determine the real-number input value on the analog (or RNM) side of the boundary. Likewise, in some embodiments, a real-to-logic converter located at an analog-to-digital boundary in a mixed-signal design uses a corresponding power supply associated with an output logic signal to convert a real-number output from the analog (or RNM) side of the boundary to the logical or digital side of the boundary.

Referring back to FIG. 3, at 370, the dynamic verification system converts between the first format and the second format (e.g., from digital logic values to analog/RNM values or from analog/RNM values to digital logic values) based on the value converter. Techniques for performing the conversion using conversion functions according to various embodiments to perform operation 370 will be described in more detail below.

Figure 7:
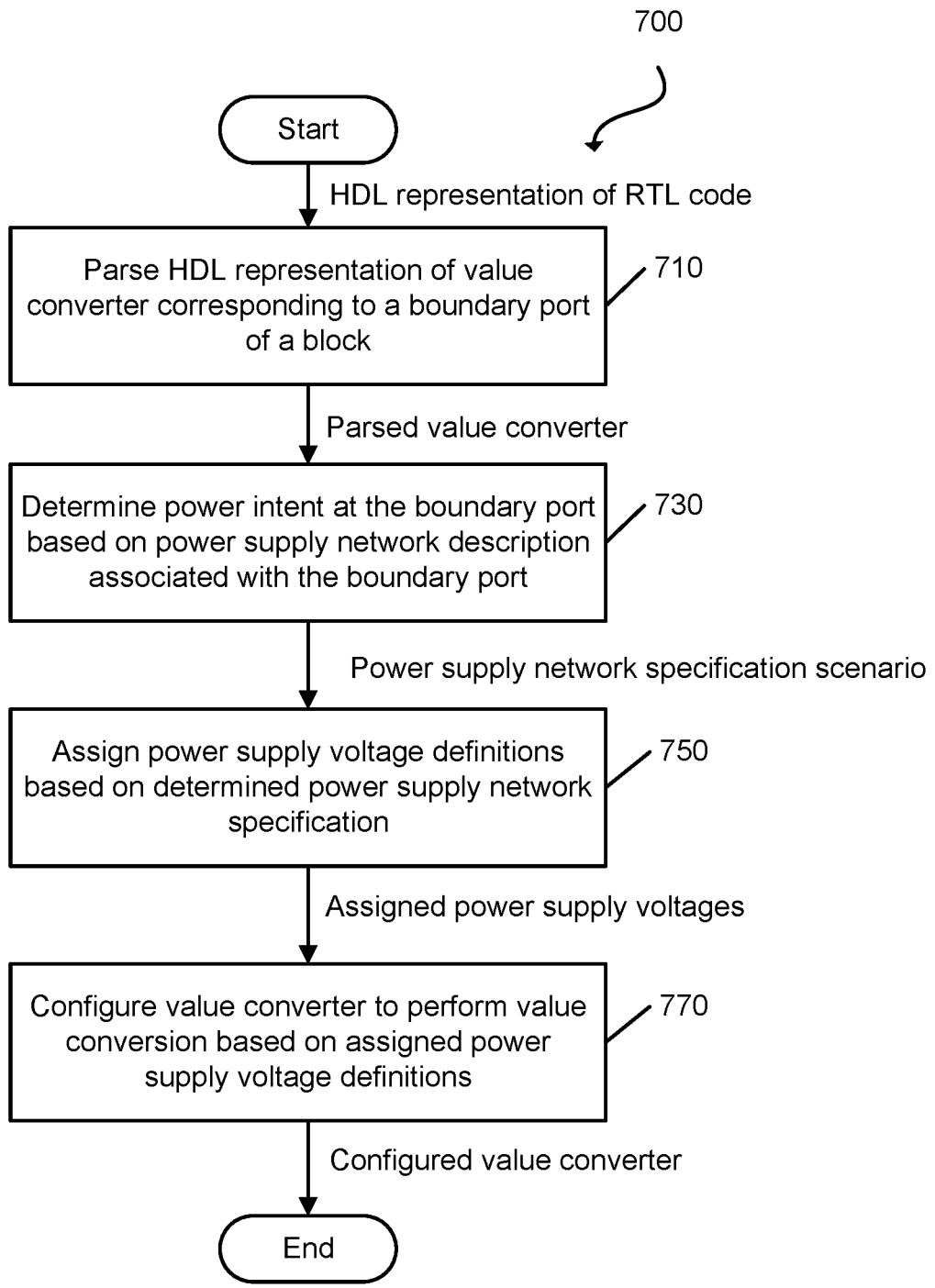
FIG. 7 is a flowchart of a method for configuring a value converter to convert between logical values representing digital logic (e.g., binary) values and real values representing analog voltages in accordance with some embodiments of the present disclosure.

FIG. 7 is a flowchart of a method 700 for configuring a value converter to convert between logical values representing digital logic (e.g., binary) values and real values representing analog voltages in accordance with some embodiments of the present disclosure.

Table 6, below, illustrates pseudocode for a UPF-aware type converter module, in accordance with some embodiments of the present disclosure.

TABLE 6

```
module logic_to_real_converter (input logic logic_inp, output wreal outr);
    parameter real HI = 3.0;
    parameter real LO = 0.0;
    (* cm_power *)  UPF::supply_net_type  vdd = '{FULL_ON, HI*pow(10,6)};
    (* cm_ground *) UPF::supply_net_type  vss = '{FULL_ON, LO*pow(10,6)};
    assign outr = (logic_inp===1'b1) ? vdd.voltage/pow(10,6)
                                     : vss.voltage/pow(10,6);
endmodule
```

The logic to real converter shown in Table 6 takes an input digital logic value "logic_inp" (e.g., having a digital logic value 0, 1, Z, or X) and generate a corresponding real number (wreal) output value "outr." In the example shown in Table 6, the conditional operator or ternary operator ("?") is used to compute the real valued output "outr" based on whether the input "logic_inp" was 1 (indicated by "1'b1"). If so, then the output is the value of the vdd voltage ("vdd.voltage"). Otherwise, the output is the value of the vss voltage ("vss.voltage"). (Both vdd.voltage and vss.voltage are scaled by 1/1,000,000 ("pow(10,6)") in Table 6 because this particular converter converts from UPF voltages, which are specified in microvolts (μV) to SystemVerilog RNM voltages, which are specified in volts (V)).

As seen in the example of Table 6, the conversion from a digital logic value to a real value depends on two variables, "vdd" and "vss" corresponding to a power voltage and a ground voltage, declared locally inside the module. By way of a non-limiting example, one variable may have an attribute "cm_power," and the other variable may have an attribute "cm_ground." These two local variables may be of type supply_net_type, which may be defined in the standard UPF package.

These two variables, "vdd" and "vss," may have local initializations in the value converter, as shown above in Table 6, as indicated by "{FULL_ON, HI*pow(10,6)}" and "{FULL_ON, LO*pow(10,6)}," respectively. These local initializations may be effective in a circumstances in which there is no power supply network connected to the design (e.g., a non-UPF context). Accordingly, the converter may define default values to be used in the case where there is no connected power supply network (e.g., the values HI=3.0 and LO=0.0, as shown in Table 6). On the other hand, if the converter is instantiated in a power supply network-managed region (e.g., under a UPF power-top), then these local initializations may be removed, and these two variables are then be driven, instead, from the inferred power and ground rails in the power supply network, as described in more detail below.

Table 7, below, provides one example of a converter module according to one embodiment of the present disclosure, defined in SystemVerilog, for converting digital logic values to real values, and Table 8, below, provides an example of a corresponding UPF package. As seen in Table 7, a "Logic2Real" converter module takes an input digital logic value "log Inp" (of type "logic") and generates a real number voltage value (of type "wreal").

TABLE 7

```
import UPF ::*;
module Logic2Real (realOut, logInp); /* converter module */
    output  wreal realOut;
    input   logic logInp;
    (* cm_power *)  UPF::supply_net_type  vdd;
    (* cm_ground *) UPF::supply_net_type  vss;
    assign realOut = (logInp ===1'b1)? real' (vdd.voltage/1000000)
                   : (logInp ===1'b0)? real' (vss.voltage/1000000)
                   : (logInp ===1'bz)? 'wrealZState : 'wrealXState;
endmodule
```

TABLE 8

```
UPF Package:
typedef struct packed {
    // UNDETERMINED, OFF, PARTIAL_CN, FULL_CN
    state state;
```

TABLE 8-continued

```
    // Voltage in micro volts
    int voltage;
} supply_net_type;
```

In contrast to the example of a conversion function shown in Table 6, above, the local initializations of power voltage "vdd" and ground voltage "vss" (as indicated by "{FULL_ON, HI*pow(10,6)}" and "{FULL_ON, LO*pow(10,6)}") have been removed. Instead, the values of the power supply ("vdd" and "vss") used in the conversion are dynamically supplied during runtime (e.g., during simulation or emulation) based on the power supply network (e.g., Table 8). Accordingly, a converter function according to embodiments of the present disclosure more accurately performs conversions between digital signals and analog signals in accordance with the state of the power supply controlling the corresponding pins.

While Table 7 provides an example of a logic-to-real converter (e.g., a converter to be used at a digital-to-analog boundary pin or port), embodiments of the present disclosure are not limited thereto and may also be applied to performing real-to-logic conversions (e.g., a converter to be used at an analog-to-digital boundary pin or port). In more detail, a real-to-logic conversion may convert a real-valued voltage into a digital logic signal (e.g., 0, 1, X, or Z), where different ranges of voltages may be mapped to different digital logic signals. For example, an analog or real numbered voltage near a ground voltage vss (e.g., within a threshold voltage difference of vss) may be mapped to logical low signal (e.g., logical zero in the case of an active-high signal), and an analog or real numbered voltage near a power voltage vdd (e.g., within a threshold voltage difference of vdd) is mapped to logical high (e.g., logical one in the case of an active-high signal), and values in between may be mapped to unknown (logic X). This converter may be implemented as, for example, a Real2Logic module having behavior that depends on the values of vss and vdd dynamically supplied to the converter during runtime (e.g., during simulation or emulation), as described in more detail below.

Referring to FIG. 7, at 710, the dynamic verification system parses an HDL representation of a value converter corresponding to a boundary port of a circuit portion. A same value converter may be used with more than one port of a circuit portion and/or may be used with ports of different circuit portions, and may need to be parsed only once for use with the various circuit portions.

At 730, the dynamic verification system determines a power intent at the boundary port of the circuit portion that is currently being considered based on a power supply network description associated with the boundary port. In more detail, the power intent of a port (or pin) of a circuit portion (e.g., the voltages of the power and ground corresponding to the port) may be specified in multiple different ways. Because there are multiple ways to specify the power intent associated with a port, some aspects of embodiments of the present disclosure relate to assigning power supply voltage definitions to a value converter in operation 750 based on different priorities associated with the different definitions.

Table 9 summarizes three different ways in which power intent of a port may be defined ("Scenario") in the case of UPF, along with the priorities associated with the different types of definitions, and the assignments of voltages to the power supply values in the converter (e.g., "vss" and "vdd") in accordance with some embodiments. Referring to Table 9, three ways in which the power intent may be specified include: a set_related_supply_net (SRSN) and/or set_port_attributes (SPA) specified in the power supply network (e.g., the UPF supply network); a Liberty specification associated with the boundary port of the DB cell; and a power domain (PD) associated with the DB cell.

TABLE 9

| Priority | Scenario | Power Supply Assignments |
|---|---|---|
| 1 | Port has related supply network (set_related_supply_net (SRSN)) and/or port attributes (set_port_attributes (SPA)) specified in the UPF | Get the supply information from SPA<br>Input port: Get receiver_supply<br>Output port: Get driver_supply<br>Connect this supply with the converter instance |
| 2 | Child instance has a liberty specification | Get the supply information from Liberty<br>Get supply connected to related power, ground pins corresponding to the port<br>Connect this Liberty supply with the converter instance |
| 3 | Primary Supply of Power Domain of Child Instance | Let the power domain of the child instance be PD<br>Connect PD.primary to the converter instance |

Figure 8A:
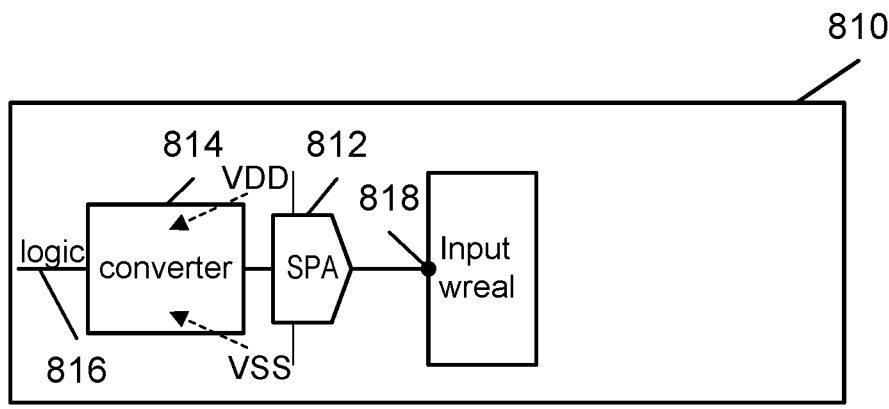
FIG. 8A illustrates a case where set_port_attributes (SPA) is specified in a UPF specification, and therefore the dynamic verification system provides the values of VDD and VSS from the SPA of the UPF specification to the converter as the values of the power supply (e.g., variables "vdd" and "vss").

As shown in Table 9, in a case where the dynamic verification system determines, at 730, a power supply network specification scenario at a boundary port corresponding to a case where the port has a related supply network (set_related_supply_net (SRSN)) and/or a port attribute (set_port_attributes (SPA)) specified. At 750, the dynamic verification system retrieves power supply information for the value converter according to the specified port attributes. By way of a non-limiting example, for an input port, receiver supply may be obtained and, for an output port, driver supply may be obtained. Receiver supply at the input port and driver supply at the output port may then be connected with a converter instance. FIG. 8A illustrates a case 810 where set_port_attributes (SPA) 812 is specified in a UPF specification, and therefore the dynamic verification system provides the values of VDD and VSS from the SPA of the UPF specification to the converter 814 as the values of the power supply (e.g., variables "vdd" and "vss"), where the converter 814 converts a logic input 816 into a real-valued input provided to real input port 818 (having type wreal in SystemVerilog).

Figure 8B:
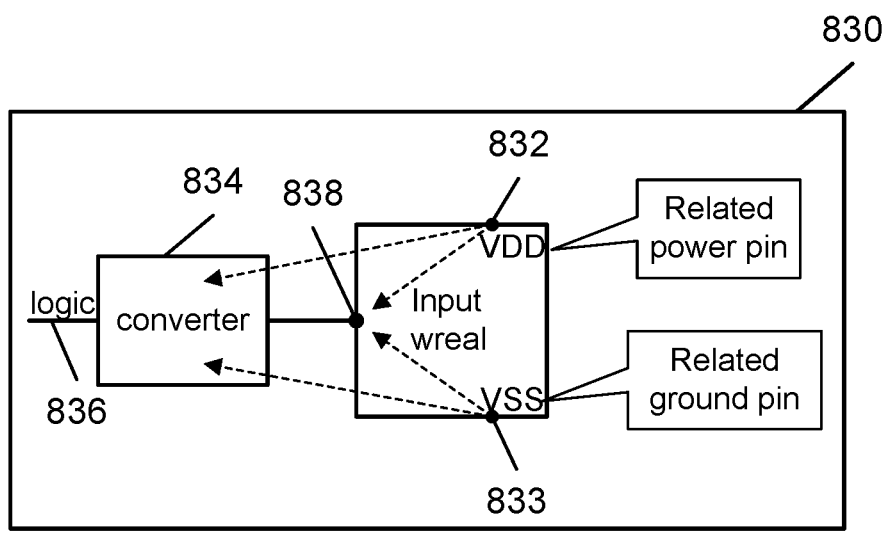
FIG. 8B illustrates a case where supply information from a Liberty file associated with the circuit portion of the port is provided to the converter instance.

In some embodiments, if the set_related_supply_net (SRSN) and/or set_port_attributes (SPA) are not specified, then the dynamic verification system determines if there is a child instance of the analog circuit/module. If so, then power supply and ground information for the child instance may be retrieved from a specified power intent (e.g., specified in a Liberty file) associated with the analog circuit/module, and these power supply and ground values associated with the port (e.g., based on the "related_power_pin" specifications of the Liberty file, see, e.g., Table 1, above) are connected to the converter instance. FIG. 8B illustrates a case 830 where supply information from a Liberty file, in the form of a related VDD power pin 832 and a related VSS power pin 833 associated with the circuit portion of the input port 838 is provided to the converter instance 834 to convert a logic input 836 into a real-valued input provided to real input port 838.

Figure 8C:
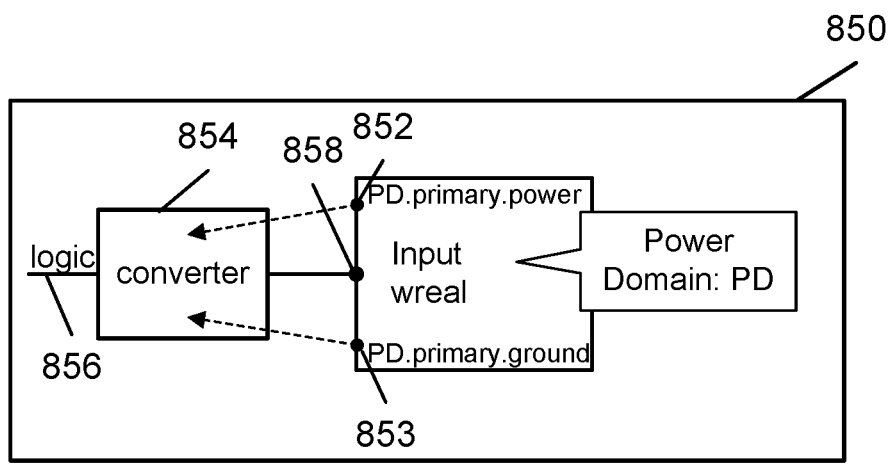
FIG. 8C illustrates a case where supply information from power domain associated with the circuit portion of the port is provided to the converter instance.

Similarly, if the set_related_supply_net (SRSN) and/or set_port_attributes (SPA) are not specified and there is no associated definition of the power supply and ground values from, for example, a Liberty file, and the child instance does not have a different power domain, then the dynamic verification system connects the primary supply of that power domain to the converter instance. FIG. 8C illustrates a case 850 where supply information from a power domain, in the form of a primary power (e.g., VDD) 852 and a primary ground (e.g., VSS) 853, associated with the circuit portion of the input port 858 is provided to the converter instance 854 to convert a logic input 856 into a real-valued input provided to real input port 858.

Referring back to FIG. 7, during runtime, at 770, the dynamic verification system configures the value converter to perform value conversions using the assigned power supply voltage definitions. During runtime, the dynamic verification system supplies correct power supply voltages corresponding to the assigned power supply voltage definitions, to the converter (in accordance with the state of the simulation or emulation of the mixed-signal integrated circuit design) to perform the value conversions between the analog and digital domains.

In some embodiments, any additional converter module while converting value between the supply-pins (SV-real or logic) of the analog circuit portion and the 'UPF::supply_net_type' supply-pins of the converter module may not be inserted. Accordingly, C-code for this value conversion may be generated and used at runtime on a demand basis that may improve runtime-memory performance.

Based embodiments as described above, aspects of embodiments of the present disclosure relate to detecting multiple definitions of power supply voltages in mixed-signal integrated circuit designs, and resolving or synchronizing the multiple definitions (e.g., as defined in both RTL routing and a power supply network defined in UPF). Some aspects of embodiments relate to automatically generating and inserting assertions into a RTL description of the circuit to detect when different power supply definitions provide different voltage values, where these assertions generate notifications (e.g., to be reported to a verification engineer through an alert in a user interface, an email alert, a mobile application notification, or the like) when there is any discrepancy between the routed RTL power supplies and the power supply network (e.g., UPF) supplies. Some aspects also relate to value converters configured to produce correct voltage values when an RNM (e.g., real-valued or floating point valued) signal crosses voltage domains by taking into consideration power supply information from the power supply network. Dynamic verification systems according to various embodiments also insert isolation gates due to the UPF-CSN connections to the supply-pins of the analog circuit portions, thereby providing additional systems to validate the RNM designs (e.g., mixed-signal integrated circuit designs) in presence of a power supply network (e.g., defined in UPF).

Figure 9:
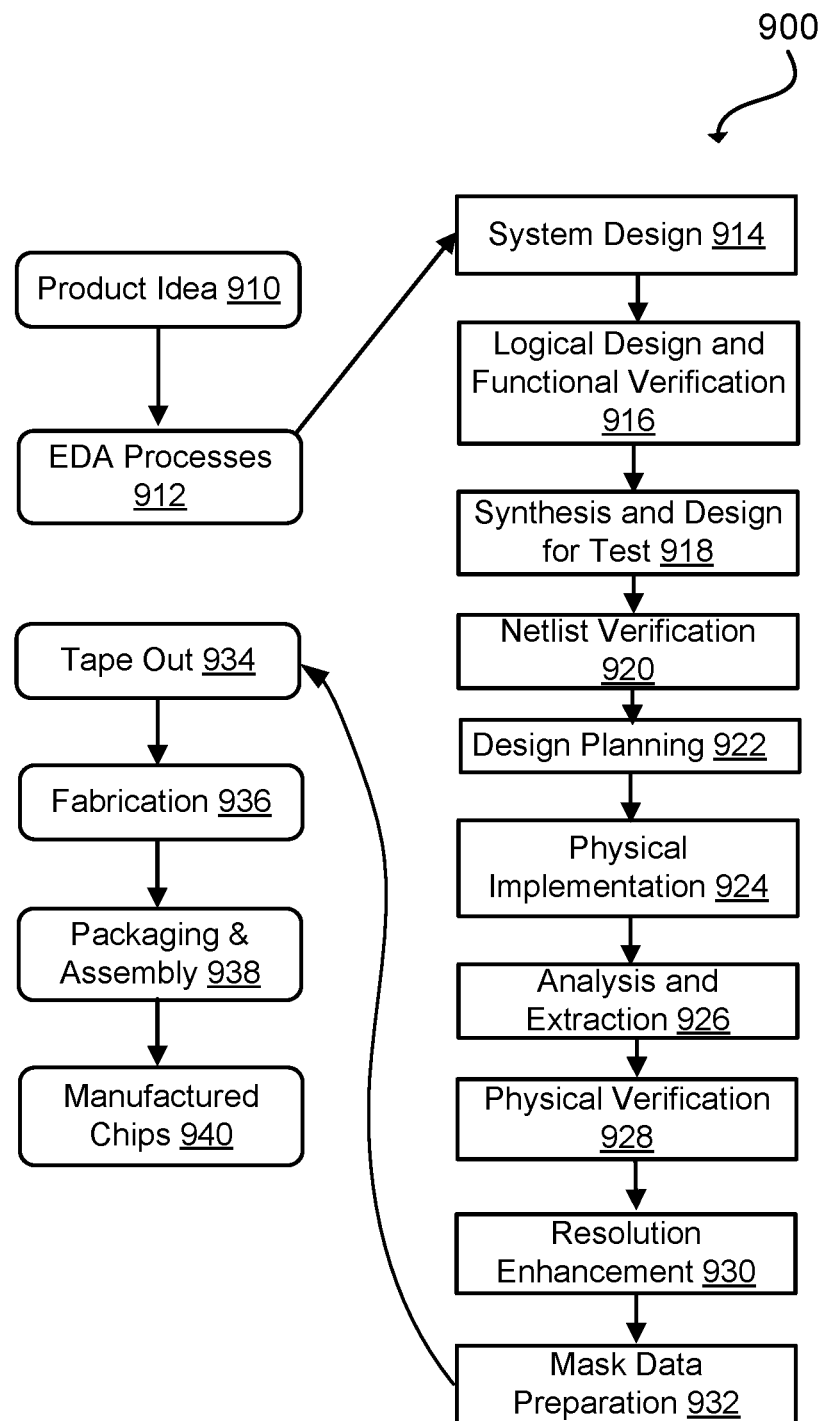
FIG. 9 depicts a flowchart of various processes used during the design and manufacture of an integrated circuit in accordance with some embodiments of the present disclosure.

FIG. 9 illustrates an example set of processes 900 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 910 with information supplied by a designer, information which is transformed to create an article of manufacture that uses a set of EDA processes 912. When the design is finalized, the design is taped-out 934, which is when artwork (e.g., geometric patterns) for the integrated circuit is sent to a fabrication facility to manufacture the mask set, which is then used to manufacture the integrated circuit. After tapeout, a semiconductor die is fabricated 936 and packaging and assembly processes 938 are performed to produce the finished integrated circuit 940.

Specifications for a circuit or electronic structure may range from low-level transistor material layouts to high-level description languages. A high-level of representation may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower representation level that is a more detailed description adds more useful detail into the design description, for example, more details for the modules that include the description. The lower levels of representation that are more detailed descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding tools of that layer (e.g., a formal verification tool). A design process may use a sequence depicted in FIG. 9. The processes described may be enabled by EDA products (or tools).

During system design 914, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 916, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification. As one example, some embodiments of the present disclosure are used during functional verification to improve the accuracy of simulators and emulators when verifying the functionality of mixed-signal integrated circuit designs.

During synthesis and design for test 918, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 920, the netlist is checked for compliance with timing constraints and for correspondence with the HDL code. During design planning 922, an overall floor plan for the integrated circuit is constructed and analyzed for timing and top-level routing.

During layout or physical implementation 924, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' or circuit portion may refer to two or more cells. Both a cell and a circuit block (or circuit portion) can be referred to as a module or component and are enabled as both physical structures and in simulations. Parameters are specified for selected cells (based on 'standard cells') such as size and made accessible in a database for use by EDA products.

During analysis and extraction 926, the circuit function is verified at the layout level, which permits refinement of the layout design. During physical verification 928, the layout design is checked to ensure that manufacturing constraints are correct, such as DRC constraints, electrical constraints, lithographic constraints, and that circuitry function matches the HDL design specification. During resolution enhancement 930, the geometry of the layout is transformed to improve how the circuit design is manufactured.

During tape-out, data is created to be used (after lithographic enhancements are applied if appropriate) for production of lithography masks. During mask data preparation 932, the 'tape-out' data is used to produce lithography masks that are used to produce finished integrated circuits.

A storage subsystem of a computer system (such as computer system 1100 of FIG. 11, or host system 1007 of FIG. 10) may be used to store the programs and data structures that are used by some or all of the EDA products described herein, and products used for development of cells for the library and for physical and logical design that use the library.

Figure 10:
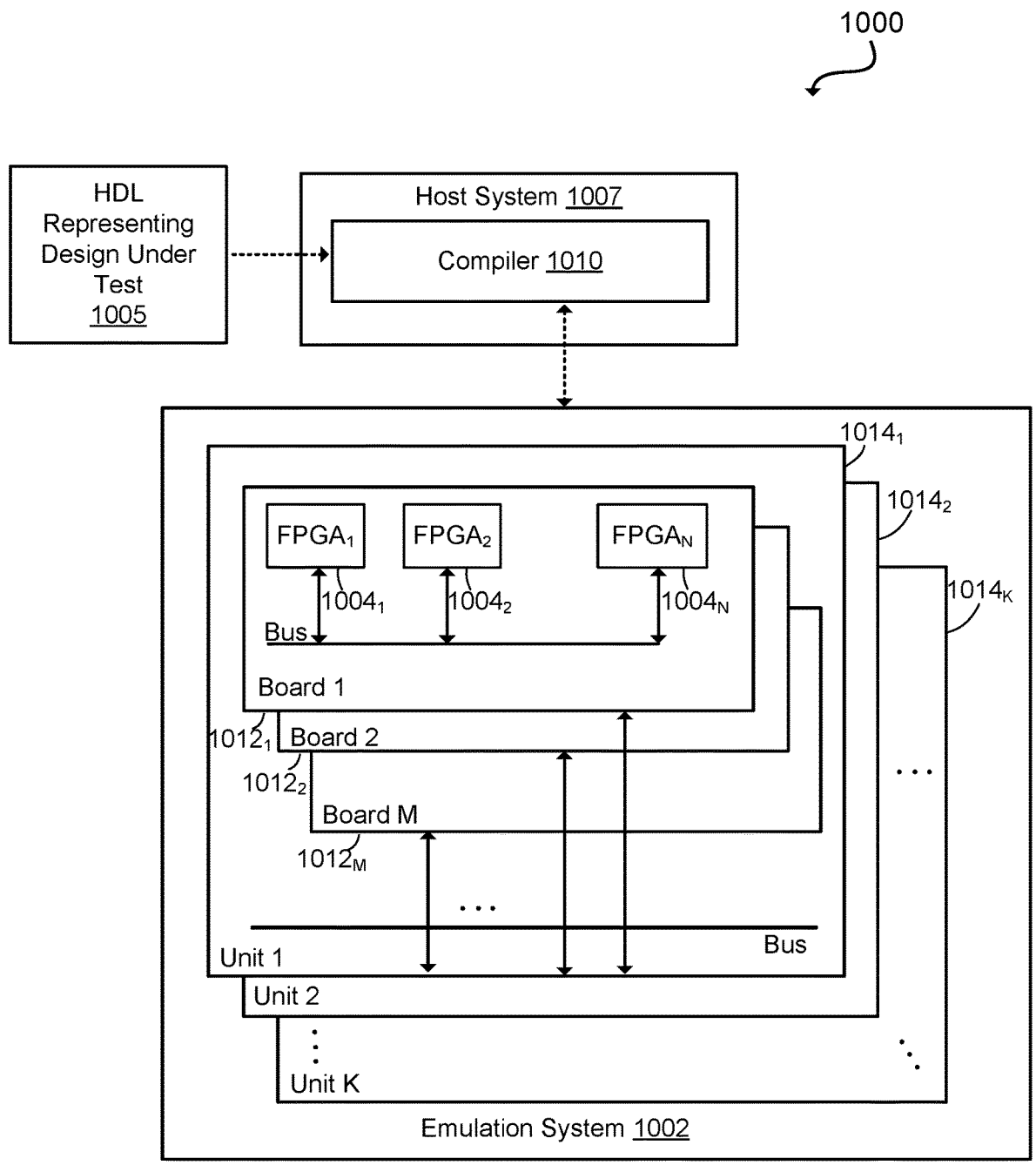
FIG. 10 depicts a diagram of an example emulation system in accordance with some embodiments of the present disclosure.

FIG. 10 depicts a diagram of an example emulation environment 1000. An emulation environment 1000 may be configured to verify the functionality of the circuit design. The emulation environment 1000 may include a host system 1007 (e.g., a computer that is part of an EDA system) and an emulation system 1002 (e.g., a set of programmable devices such as Field Programmable Gate Arrays (FPGAs) or processors). The host system generates data and information by using a compiler 1010 to structure the emulation system to emulate a circuit design. A circuit design to be emulated is also referred to as a Design Under Test ('DUT') where data and information from the emulation are used to verify the functionality of the DUT.

The host system 1007 may include one or more processors. In the embodiment where the host system includes multiple processors, the functions described herein as being performed by the host system can be distributed among the multiple processors. The host system 1007 may include a compiler 1010 to transform specifications written in a description language that represents a DUT and to produce data (e.g., binary data) and information that is used to structure the emulation system 1002 to emulate the DUT. The compiler 1010 can transform, change, restructure, add new functions to, and/or control the timing of the DUT.

The host system 1007 and emulation system 1002 exchange data and information using signals carried by an emulation connection. The connection can be, but is not limited to, one or more electrical cables such as cables with pin structures compatible with the Recommended Standard 232 (RS232) or universal serial bus (USB) protocols. The connection can be a wired communication medium or network such as a local area network or a wide area network such as the Internet. The connection can be a wireless communication medium or a network with one or more points of access using a wireless protocol such as BLUETOOTH® or IEEE 802.11. The host system 1007 and emulation system 1002 can exchange data and information through a third device such as a network server.

The emulation system 1002 includes multiple FPGAs (or other modules) such as FPGAs $1004_1$ and $1004_2$ as well as additional FPGAs to $1004_N$. Each FPGA can include one or more FPGA interfaces through which the FPGA is connected to other FPGAs (and potentially other emulation components) for the FPGAs to exchange signals. An FPGA interface can be referred to as an input/output pin or an FPGA pad. While an emulator may include FPGAs, embodiments of emulators can include other types of logic blocks instead of, or along with, the FPGAs for emulating DUTs. For example, the emulation system 1002 can include custom FPGAs, specialized ASICs for emulation or prototyping, memories, and input/output devices.

A programmable device can include an array of programmable logic blocks and a hierarchy of interconnections that can enable the programmable logic blocks to be interconnected according to the descriptions in the HDL code. Each of the programmable logic blocks can enable complex combinational functions or enable logic gates such as AND, and XOR logic blocks. In some embodiments, the logic blocks also can include memory elements/devices, which can be simple latches, flip-flops, or other blocks of memory. Depending on the length of the interconnections between different logic blocks, signals can arrive at input terminals of the logic blocks at different times and thus may be temporarily stored in the memory elements/devices.

FPGAs $1004_1$-$1004_N$ may be placed onto one or more boards $1012_1$ and $1012_2$ as well as additional boards through $1012_M$. Multiple boards can be placed into an emulation unit $1014_1$. The boards within an emulation unit can be connected using the backplane of the emulation unit or any other types of connections. In addition, multiple emulation units (e.g., $1014_1$ and $1014_2$ through $1014_K$) can be connected to each other by cables or any other means to form a multi-emulation unit system.

For a DUT that is to be emulated, the host system 1007 transmits one or more bit files to the emulation system 1002. The bit files may specify a description of the DUT and may further specify partitions of the DUT created by the host system 1007 with trace and injection logic, mappings of the partitions to the FPGAs of the emulator, and design constraints. Using the bit files, the emulator structures the FPGAs to perform the functions of the DUT. In some embodiments, when the DUT includes analog circuit portions, the analog circuit portions may be mapped to digital signal processors (DSPs). integrated into the FPGAs, and aspects of embodiments of the present disclosure instantiate and configure value converters at the boundaries of the analog circuit portions of the DUT in accordance with the techniques described above. In some embodiments, one or more FPGAs of the emulators may have the trace and injection logic built into the silicon of the FPGA. In such an embodiment, the FPGAs may not be structured by the host system to emulate trace and injection logic.

The host system 1007 receives a description of a DUT that is to be emulated. In some embodiments, the DUT description is in a description language (e.g., a register transfer language (RTL)). In some embodiments, the DUT description is in netlist level files or a mix of netlist level files and HDL files. If part of the DUT description or the entire DUT description is in an HDL, then the host system can synthesize the DUT description to create a gate level netlist using the DUT description. A host system can use the netlist of the DUT to partition the DUT into multiple partitions where one or more of the partitions include trace and injection logic. The trace and injection logic traces interface signals that are exchanged via the interfaces of an FPGA. Additionally, the trace and injection logic can inject traced interface signals into the logic of the FPGA. The host system maps each partition to an FPGA of the emulator. In some embodiments, the trace and injection logic is included in select partitions for a group of FPGAs. The trace and injection logic can be built into one or more of the FPGAs of an emulator. The host system can synthesize multiplexers to be mapped into the FPGAs. The multiplexers can be used by the trace and injection logic to inject interface signals into the DUT logic.

The host system creates bit files describing each partition of the DUT and the mapping of the partitions to the FPGAs. For partitions in which trace and injection logic are included, the bit files also describe the logic that is included. The bit files can include place and route information and design constraints. The host system stores the bit files and information describing which FPGAs are to emulate each component of the DUT (e.g., to which FPGAs each component is mapped).

Upon request, the host system transmits the bit files to the emulator. The host system signals the emulator to start the emulation of the DUT. During emulation of the DUT or at the end of the emulation, the host system receives emulation results from the emulator through the emulation connection. Emulation results are data and information generated by the emulator during the emulation of the DUT which include interface signals and states of interface signals that have been traced by the trace and injection logic of each FPGA. The host system can store the emulation results and/or transmits the emulation results to another processing system.

After emulation of the DUT, a circuit designer can request to debug a component of the DUT. If such a request is made, the circuit designer can specify a time period of the emulation to debug. The host system identifies which FPGAs are emulating the component using the stored information. The host system retrieves stored interface signals associated with the time period and traced by the trace and injection logic of each identified FPGA. The host system signals the emulator to re-emulate the identified FPGAs. The host system transmits the retrieved interface signals to the emulator to re-emulate the component for the specified time period. The trace and injection logic of each identified FPGA injects its respective interface signals received from the host system into the logic of the DUT mapped to the FPGA. In case of multiple re-emulations of an FPGA, merging the results produces a full debug view.

The host system receives, from the emulation system, signals traced by logic of the identified FPGAs during the re-emulation of the component. The host system stores the signals received from the emulator. The signals traced during the re-emulation can have a higher sampling rate than the sampling rate during the initial emulation. For example, in the initial emulation a traced signal can include a saved state of the component every X milliseconds. However, in the re-emulation the traced signal can include a saved state every Y milliseconds where Y is less than X. If the circuit designer requests to view a waveform of a signal traced during the re-emulation, the host system can retrieve the stored signal and display a plot of the signal. For example, the host system can generate a waveform of the signal. Afterwards, the circuit designer can request to re-emulate the same component for a different time period or to re-emulate another component.

A host system 1007 and/or the compiler 1010 may include sub-systems such as, but not limited to, a design synthesizer sub-system, a mapping sub-system, a run time sub-system, a results sub-system, a debug sub-system, a waveform sub-system, and a storage sub-system. The sub-systems can be structured and enabled as individual or multiple modules or two or more may be structured as a module. Together these sub-systems structure the emulator and monitor the emulation results.

The design synthesizer sub-system transforms the HDL that is representing a DUT 1005 into gate level logic. For a DUT that is to be emulated, the design synthesizer sub-system receives a description of the DUT. If the description of the DUT is fully or partially in HDL (e.g., RTL or other level of representation), the design synthesizer sub-system synthesizes the HDL of the DUT to create a gate-level netlist with a description of the DUT in terms of gate level logic.

The mapping sub-system partitions DUTs and maps the partitions into emulator FPGAs. The mapping sub-system partitions a DUT at the gate level into a number of partitions using the netlist of the DUT. For each partition, the mapping sub-system retrieves a gate level description of the trace and injection logic and adds the logic to the partition. As described above, the trace and injection logic included in a partition is used to trace signals exchanged via the interfaces of an FPGA to which the partition is mapped (trace interface signals). The trace and injection logic can be added to the DUT prior to the partitioning. For example, the trace and injection logic can be added by the design synthesizer sub-system prior to or after the synthesizing the HDL of the DUT.

In addition to including the trace and injection logic, the mapping sub-system can include additional tracing logic in a partition to trace the states of certain DUT components that are not traced by the trace and injection. The mapping sub-system can include the additional tracing logic in the DUT prior to the partitioning or in partitions after the partitioning. The design synthesizer sub-system can include the additional tracing logic in an HDL description of the DUT prior to synthesizing the HDL description.

The mapping sub-system maps each partition of the DUT to an FPGA of the emulator. For partitioning and mapping, the mapping sub-system uses design rules, design constraints (e.g., timing or logic constraints), and information about the emulator. For components of the DUT, the mapping sub-system stores information in the storage sub-system describing which FPGAs are to emulate each component.

Using the partitioning and the mapping, the mapping sub-system generates one or more bit files that describe the created partitions and the mapping of logic to each FPGA of the emulator. The bit files can include additional information such as constraints of the DUT and routing information of connections between FPGAs and connections within each FPGA. The mapping sub-system can generate a bit file for each partition of the DUT and can store the bit file in the storage sub-system. Upon request from a circuit designer, the mapping sub-system transmits the bit files to the emulator, and the emulator can use the bit files to structure the FPGAs to emulate the DUT.

If the emulator includes specialized ASICs that include the trace and injection logic, the mapping sub-system can generate a specific structure that connects the specialized ASICs to the DUT. In some embodiments, the mapping sub-system can save the information of the traced/injected signal and where the information is stored on the specialized ASIC.

The run time sub-system controls emulations performed by the emulator. The run time sub-system can cause the emulator to start or stop executing an emulation. Additionally, the run time sub-system can provide input signals and data to the emulator. The input signals can be provided directly to the emulator through the connection or indirectly through other input signal devices. For example, the host system can control an input signal device to provide the input signals to the emulator. The input signal device can be, for example, a test board (directly or through cables), signal generator, another emulator, or another host system.

The results sub-system processes emulation results generated by the emulator. During emulation and/or after completing the emulation, the results sub-system receives emulation results from the emulator generated during the emulation. The emulation results include signals traced during the emulation. Specifically, the emulation results include interface signals traced by the trace and injection logic emulated by each FPGA and can include signals traced by additional logic included in the DUT. Each traced signal can span multiple cycles of the emulation. A traced signal includes multiple states and each state is associated with a time of the emulation. The results sub-system stores the traced signals in the storage sub-system. For each stored signal, the results sub-system can store information indicating which FPGA generated the traced signal.

The debug sub-system allows circuit designers to debug DUT components. After the emulator has emulated a DUT and the results sub-system has received the interface signals traced by the trace and injection logic during the emulation, a circuit designer can request to debug a component of the DUT by re-emulating the component for a specific time period. In a request to debug a component, the circuit designer identifies the component and indicates a time period of the emulation to debug. The circuit designer's request can include a sampling rate that indicates how often states of debugged components should be saved by logic that traces signals.

The debug sub-system identifies one or more FPGAs of the emulator that are emulating the component using the information stored by the mapping sub-system in the storage sub-system. For each identified FPGA, the debug sub-system retrieves, from the storage sub-system, interface signals traced by the trace and injection logic of the FPGA during the time period indicated by the circuit designer. For example, the debug sub-system retrieves states traced by the trace and injection logic that are associated with the time period.

The debug sub-system transmits the retrieved interface signals to the emulator. The debug sub-system instructs the debug sub-system to use the identified FPGAs and for the trace and injection logic of each identified FPGA to inject its respective traced signals into logic of the FPGA to re-emulate the component for the requested time period. The debug sub-system can further transmit the sampling rate provided by the circuit designer to the emulator so that the tracing logic traces states at the proper intervals.

To debug the component, the emulator can use the FPGAs to which the component has been mapped. Additionally, the re-emulation of the component can be performed at any point specified by the circuit designer.

For an identified FPGA, the debug sub-system can transmit instructions to the emulator to load multiple emulator FPGAs with the same configuration of the identified FPGA. The debug sub-system additionally signals the emulator to use the multiple FPGAs in parallel. Each FPGA from the multiple FPGAs is used with a different time window of the interface signals to generate a larger time window in a shorter amount of time. For example, the identified FPGA can require an hour or more to use a certain amount of cycles. However, if multiple FPGAs have the same data and structure of the identified FPGA and each of these FPGAs runs a subset of the cycles, the emulator can require a few minutes for the FPGAs to collectively use all the cycles.

A circuit designer can identify a hierarchy or a list of DUT signals to re-emulate. To enable this, the debug sub-system determines the FPGA needed to emulate the hierarchy or list of signals, retrieves the necessary interface signals, and transmits the retrieved interface signals to the emulator for re-emulation. Thus, a circuit designer can identify any element (e.g., component, device, or signal) of the DUT to debug/re-emulate.

The waveform sub-system generates waveforms using the traced signals. If a circuit designer requests to view a waveform of a signal traced during an emulation run, the host system retrieves the signal from the storage sub-system. The waveform sub-system displays a plot of the signal. For one or more signals, when the signals are received from the emulator, the waveform sub-system can automatically generate the plots of the signals.

Figure 11:
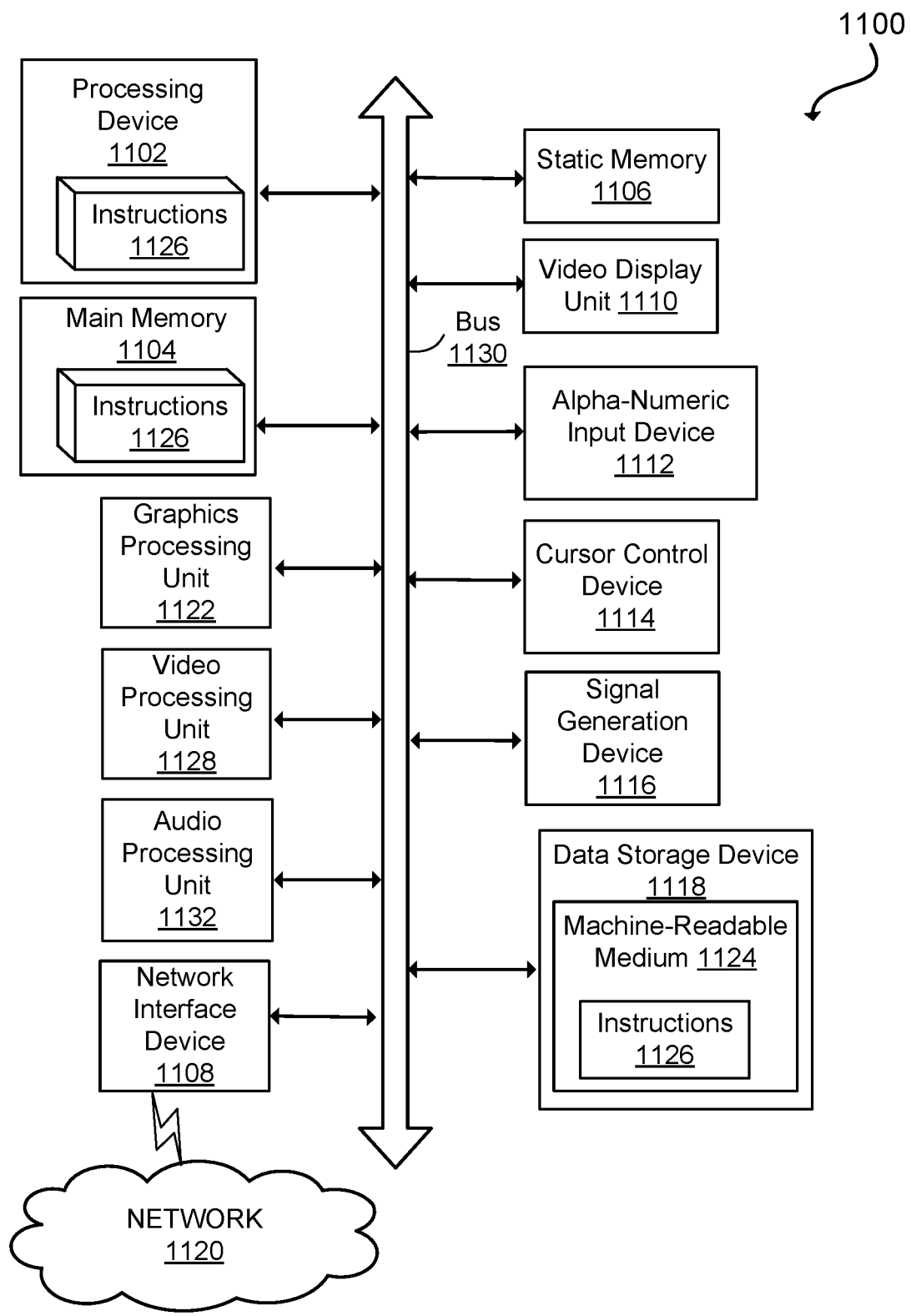
FIG. 11 depicts a diagram of an example computer system in which embodiments of the present disclosure may operate.

FIG. 11 illustrates an example machine of a computer system 1100 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1100 includes a processing device 1102, a main memory 1104 (e.g., read-only memory (ROM), flash memory, dynamic random access memory (DRAM) such as synchronous DRAM (SDRAM), a static memory 1106 (e.g., flash memory, static random access memory (SRAM), etc.), and a data storage device 1118, which communicate with each other via a bus 1130.

Processing device 1102 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1102 may also be one or more special-purpose processing devices such as an application specific integrated circuit (ASIC), a field programmable gate array (FPGA), a digital signal processor (DSP), network processor, or the like. The processing device 1102 may be configured to execute instructions 1126 for performing the operations and steps described herein.

The computer system 1100 may further include a network interface device 1108 to communicate over the network 1120. The computer system 1100 also may include a video display unit 1110 (e.g., a liquid crystal display (LCD) or a cathode ray tube (CRT)), an alphanumeric input device 1112 (e.g., a keyboard), a cursor control device 1114 (e.g., a mouse), a graphics processing unit 1122, a signal generation device 1116 (e.g., a speaker), graphics processing unit 1122, video processing unit 1128, and audio processing unit 1132.

The data storage device 1118 may include a machine-readable storage medium 1124 (also known as a non-transitory computer-readable medium) on which is stored one or more sets of instructions 1126 or software embodying any one or more of the methodologies or functions described herein. The instructions 1126 may also reside, completely or at least partially, within the main memory 1104 and/or within the processing device 1102 during execution thereof by the computer system 1100, the main memory 1104 and the processing device 1102 also constituting machine-readable storage media.

In some implementations, the instructions 1126 include instructions to implement functionality corresponding to the present disclosure. While the machine-readable storage medium 1124 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 1102 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method, comprising:
   receiving a representation of a mixed-signal integrated circuit design comprising an analog circuit portion and a digital circuit portion including a plurality of descriptions of a power supply, the descriptions comprising a power supply network description and a register transfer level (RTL) hardware description language (HDL) description;
   determining a mismatch between the power supply network description and the HDL description of the power supply;
   generating a value converter to convert a voltage value associated with the power supply between the power supply network description and the HDL description; and
   converting, by a processor, between the power supply network description and the HDL description during runtime using the value converter to synchronize the power supply network description and the HDL description of the power supply responsive to the mismatch.

2. The method of claim 1, wherein the generating the value converter further comprises
   assigning a direction to a supply pin of the analog circuit portion, the direction being selected from a group comprising:
      a power supply network to HDL direction (UPF2HDL); and
      an HDL to power supply network direction (HDL2UPF);
   responsive to assigning the direction of the supply pin as UPF2HDL, when an HDL driver is present, generating the value converter to propagate a voltage value from the HDL description of the power supply to the supply pin, otherwise generating the value converter to propagate a voltage value from the power supply network to the supply pin; and
   responsive to assigning the direction of the supply pin as HDL2UPF, generating the value converter to propagate a voltage value output by the analog circuit portion to the HDL description of the power supply and to the power supply network description of the power supply.

3. The method of claim 1, wherein the generating the value converter further comprises:
   detecting two different variables representing a voltage of a supply pin of the analog circuit portion of the mixed-signal integrated circuit design, the two different variables being defined based on the power supply network description and the HDL description;
   generating an assertion function that the two different variables have a same value; and
   inserting the assertion function into the representation of the mixed-signal integrated circuit design.

4. The method of claim 3, further comprising:
   generating a notification in response to determining that the assertion function has failed, the notification indicating a difference in the voltage of the supply pin of the analog circuit portion as described by the power supply network description and the HDL description.

5. The method of claim 1, wherein the value converter is associated with a boundary port of the analog circuit portion of the mixed-signal integrated circuit design, and
   wherein the generating the value converter comprises:
      parsing an HDL representation of the value converter;
      determining a power intent associated with the boundary port based on the power supply network description;
      assigning a plurality of power supply definitions comprising a power voltage and a ground voltage to the value converter based on the determined power intent; and
      configuring the value converter based on the power supply definitions.

6. The method of claim 5, wherein the power intent of the boundary port is specified based on one or more of a supply network and a port attribute of the boundary port specified in the power supply network description.

7. The method of claim 5, wherein the power intent is based on the analog circuit portion associated with the boundary port is associated with a specified power intent associated with the analog circuit portion.

8. The method of claim 5, wherein the power intent is based on the analog circuit portion associated with the boundary port is associated with a power domain.

9. The method of claim 5, wherein the value converter is configured to convert a digital logic value to a real number value by:
- outputting the power voltage from the power supply definitions based on the determined power intent when the digital logic value is logical high; and
- outputting the ground voltage from the power supply definitions based on the determined power intent when the digital logic value is logical low.

10. The method of claim 5, wherein the value converter is configured to convert a real number value to a digital logic value by:
- outputting a logical low value as the digital logic value when the real number value is within a threshold voltage distance of the ground voltage from the power supply definitions based on the determined power intent; and
- outputting a logical high value as the digital logic value when the real number value is within the threshold voltage distance of the power voltage from the power supply definitions based on the determined power intent.

11. A system comprising:
a memory storing instructions; and
a processor, coupled with the memory and to execute the instructions, the instructions when executed cause the processor to:
- receive a representation of a mixed-signal integrated circuit design comprising an analog circuit portion and a digital circuit portion including a plurality of descriptions of a power supply, the descriptions comprising a power supply network description and a register transfer level (RTL) hardware description language (HDL) description;
- determine a mismatch between the power supply network description and the HDL description of the power supply;
- generate a value converter to convert a voltage value associated with the power supply between the power supply network description and the HDL description; and
- convert between the power supply network description and the HDL description during runtime using the value converter to synchronize the power supply network description and the HDL description of the power supply responsive to the mismatch.

12. The system of claim 11, wherein the instructions to generate the value converter further comprise instructions to:
- assign a direction to a supply pin of the analog circuit portion, the direction being selected from a group comprising:
  - a power supply network to HDL direction (UPF2HDL); and
  - an HDL to power supply network direction (HDL2UPF);
- responsive to determining that the direction of the supply pin is UPF2HDL, when an HDL driver is present, generating the value converter to propagate a voltage value from the HDL description of the power supply to the supply pin, otherwise generating the value converter to propagate a voltage value from the power supply network to the supply pin; and
- responsive to determining that the direction of the supply pin is HDL2UPF, generating the value converter to propagate a voltage value output by the analog circuit portion to the HDL description of the power supply and to the power supply network description of the power supply.

13. The system of claim 11, wherein the instructions to generate the value converter further comprise instructions that, when executed by the processor, cause the processor to:
- detect two different variables representing a voltage of a supply pin of the analog circuit portion of the mixed-signal integrated circuit design, the two different variables being defined based on the power supply network description and the HDL description;
- generate an assertion function that the two different variables have a same value; and
- insert the assertion function into the representation of the mixed-signal integrated circuit design.

14. The system of claim 11, wherein the value converter is associated with a boundary port of the analog circuit portion of the mixed-signal integrated circuit design, and
wherein the instructions to generate the value converter further comprise instructions that, when executed by the processor, cause the processor to:
- parse an HDL representation of the value converter;
- determine a power intent associated with the boundary port based on the power supply network description;
- assign a plurality of power supply definitions comprising a power voltage and a ground voltage to the value converter based on the determined power intent; and
- configure the value converter based on the power supply definitions.

15. The system of claim 14, wherein the power intent of the boundary port is specified based on one or more of:
- one or more of a supply network and a port attribute of the boundary port specified in the power supply network description the boundary port;
- the analog circuit portion associated with the boundary port is associated with a specified power intent associated with the analog circuit portion; and
- the analog circuit portion associated with the boundary port is associated with a power domain.

16. A non-transitory computer readable medium comprising stored instructions, which when executed by a processor, cause the processor to:
- receive a representation of a mixed-signal integrated circuit design comprising an analog circuit portion and a digital circuit portion including a plurality of descriptions of a power supply, the descriptions comprising a power supply network description and a register transfer level (RTL) hardware description language (HDL) description;
- determine a mismatch between the power supply network description and the HDL description of the power supply;
- generate a value converter to convert a voltage value associated with the power supply between the power supply network description and the HDL description; and
- convert between the power supply network description and the HDL description during runtime using the value converter to synchronize the power supply network description and the HDL description of the power supply responsive to the mismatch.

17. The non-transitory computer readable medium of claim 16, wherein the instructions to generate the value converter include instructions which, when executed by the processor, cause the processor to:
assign a direction to a supply pin of the analog circuit portion, the direction being selected from a group comprising:
a power supply network to HDL direction (UPF2HDL); and
an HDL to power supply network direction (HDL2UPF);
responsive to assigning the direction of the supply pin as UPF2HDL, when an HDL driver is present, generate the value converter to propagate a voltage value from the HDL description of the power supply to the supply pin, otherwise generate the value converter to propagate a voltage value from the power supply network to the supply pin; and
responsive to assigning the direction of the supply pin as HDL2UPF, generate the value converter to propagate a value output by the analog circuit portion to the HDL description of the power supply and to the power supply network description of the power supply.

18. The non-transitory computer readable medium of claim 16, wherein the instructions to generate the value converter further comprise instructions that, when executed by the processor, cause the processor to:
detect two different variables representing a voltage of a supply pin of the analog circuit portion of the mixed-signal integrated circuit design, the two different variables being defined based on the power supply network description and the HDL description;
generate an assertion function that the two different variables have a same value; and
insert the assertion function into the representation of the mixed-signal integrated circuit design.

19. The non-transitory computer readable medium of claim 16, wherein the value converter is associated with a boundary port of the analog circuit portion of the mixed-signal integrated circuit design, and
wherein the instructions to generate the value converter further comprise instructions that, when executed by the processor, cause the processor to:
parse an HDL representation of the value converter;
determine a power intent associated with the boundary port based on the power supply network description;
assign a plurality of power supply definitions comprising a power voltage and a ground voltage to the value converter based on the determined power intent; and
configure the value converter based on the power supply definitions, and wherein the power intent of the boundary port is specified based on one more of:
one or more of a supply network and a port attribute of the boundary port specified in the power supply network description;
the analog circuit portion associated with the boundary port is associated with a specified power intent associated with the analog circuit portion; and
the analog circuit portion associated with the boundary port is associated with a power domain.

20. The non-transitory computer readable medium of claim 16, further comprising instructions that, when executed by the processor, cause the processor to compile the value converter to executable machine code.

* * * * *